US012561789B2

(12) United States Patent
Johnson et al.

(10) Patent No.: US 12,561,789 B2
(45) Date of Patent: Feb. 24, 2026

(54) SYSTEMS AND METHODS FOR AUTOMATICALLY GRADING PRE-OWNED ELECTRONIC DEVICES

(71) Applicant: Assurant, Inc., New York, NY (US)

(72) Inventors: Brandon P. Johnson, Brentwood, TN (US); Roscoe R. Herald, Murfreesboro, TN (US); Harrison A. Hanks, Nashville, TN (US); Carson Farley, Smyrna, TN (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 18/748,913

(22) Filed: Jun. 20, 2024

(65) Prior Publication Data

US 2024/0412345 A1    Dec. 12, 2024

Related U.S. Application Data

(63) Continuation of application No. 18/153,804, filed on Jan. 12, 2023, now Pat. No. 12,045,973, which is a
(Continued)

(51) Int. Cl.
*G06V 20/10* (2022.01)
*G06T 7/00* (2017.01)

(52) U.S. Cl.
CPC ............ *G06T 7/0004* (2013.01); *G06V 20/10* (2022.01); *G06T 2207/10152* (2013.01); *G06T 2207/30121* (2013.01); *G06T 2207/30242* (2013.01)

(58) Field of Classification Search
CPC ......... G06T 7/0004; G06T 2207/10152; G06T 2207/30121; G06T 2207/30242;
(Continued)

(56) References Cited

U.S. PATENT DOCUMENTS 5,650,844 A    7/1997    Aoki et al.
5,717,780 A    2/1998    Mitsumune et al.
(Continued)

FOREIGN PATENT DOCUMENTS

CA    3016367 A1    9/2017
EP    3540690 A1    9/2019
(Continued)

OTHER PUBLICATIONS

U.S. Appl. No. 18/153,804, filed Jan. 12, 2023, U.S. Pat. No. 12,045,973, Issued.
(Continued)

*Primary Examiner* — Sheela C Chawan
(74) *Attorney, Agent, or Firm* — Alston & Bird LLP

(57) ABSTRACT

Systems and methods for automatically grading a user device are provided. Such systems and methods can include (1) a lighting element positioned at an angle relative to a platform, (2) an imaging device positioned at the angle relative to the platform such that light emitted from the lighting element and a field of view of the imaging device form a right angle where the light emitted from the lighting element and the field of view meet at a user device when the user device is positioned at a predetermined location on the platform, and (3) control circuitry that can activate the lighting element, instruct the imaging device to capture an image of a screen of the user device while the user device is at the predetermined location and is being illuminated by the first lighting element, and parse the image to determine whether the screen is damaged.

18 Claims, 13 Drawing Sheets

Related U.S. Application Data continuation of application No. 17/141,919, filed on Jan. 5, 2021, now Pat. No. 11,580,627.

(60) Provisional application No. 62/957,795, filed on Jan. 6, 2020.

(58) Field of Classification Search
CPC .................. G06V 20/10; G01N 21/95; G01N 2021/9513; Y02W 90/00
USPC ................................................ 382/141, 100
See application file for complete search history.

(56) References Cited

U.S. PATENT DOCUMENTS

| | | | |
|---|---|---|---|
| 5,835,220 | A | 11/1998 | Kazama et al. |
| 5,914,495 | A | 6/1999 | Ishizuka et al. |
| 6,201,601 | B1 | 3/2001 | Vaez-Iravani et al. |
| 6,259,827 | B1 | 7/2001 | Nichani |
| 6,386,038 | B1 | 5/2002 | Lewis et al. |
| 6,597,805 | B1 | 7/2003 | Nagao |
| 6,781,688 | B2 | 8/2004 | Kren et al. |
| 7,206,066 | B2 | 4/2007 | Vurens et al. |
| 7,848,833 | B2 | 12/2010 | Li et al. |
| 8,200,533 | B2 | 6/2012 | Librizzi et al. |
| 8,248,237 | B2 | 8/2012 | Fitzgerald et al. |
| 8,463,646 | B2 | 6/2013 | Bowles et al. |
| 8,719,909 | B2 | 5/2014 | Fitzgerald et al. |
| 8,822,922 | B1 | 9/2014 | Scanlon et al. |
| 8,867,817 | B1 | 10/2014 | Cooper et al. |
| 8,932,368 | B2 | 1/2015 | Fitzgerald et al. |
| 8,964,062 | B1 | 2/2015 | Neglur |
| 9,007,581 | B2 | 4/2015 | Horai et al. |
| 9,134,892 | B2 | 9/2015 | Hicks |
| 9,253,205 | B2 | 2/2016 | Fitzgerald et al. |
| 9,369,865 | B2 | 6/2016 | Hsu et al. |
| 9,576,157 | B2 | 2/2017 | Fitzgerald et al. |
| 9,703,325 | B2 | 7/2017 | Pope et al. |
| 9,838,877 | B2 | 12/2017 | Fitzgerald et al. |
| 9,881,152 | B2 | 1/2018 | Fitzgerald et al. |
| 9,885,672 | B2 | 2/2018 | Forutanpour et al. |
| 9,911,102 | B2 | 3/2018 | Bowles et al. |
| 9,916,481 | B2 | 3/2018 | Fitzgerald et al. |
| 10,001,878 | B2 | 6/2018 | Wood et al. |
| 10,007,934 | B2 | 6/2018 | Nguyen |
| 10,032,140 | B2 | 7/2018 | Bowles et al. |
| 10,055,798 | B2 | 8/2018 | Bowles et al. |
| 10,127,647 | B2 | 11/2018 | Forutanpour et al. |
| 10,269,110 | B2 | 4/2019 | Forutanpour et al. |
| 10,332,249 | B2 | 6/2019 | Dwivedi et al. |
| 10,339,509 | B2 | 7/2019 | Bordeleau et al. |
| 10,401,411 | B2 | 9/2019 | Snook et al. |
| 10,402,790 | B1 | 9/2019 | Clark et al. |
| 10,438,174 | B2 | 10/2019 | Bowles et al. |
| 10,475,002 | B2 | 11/2019 | Silva et al. |
| 10,572,946 | B2 | 2/2020 | Bowles et al. |
| 10,681,552 | B2 | 6/2020 | Fitzgerald et al. |
| 10,719,261 | B2 | 7/2020 | Törmä et al. |
| 10,810,732 | B2 | 10/2020 | Dwivedi et al. |
| 10,821,611 | B1 | 11/2020 | Defant et al. |
| 10,825,082 | B2 | 11/2020 | Librizzi et al. |
| 10,846,881 | B2 | 11/2020 | Hashimoto et al. |
| 10,860,990 | B2 | 12/2020 | Bowles et al. |
| 10,876,914 | B2 | 12/2020 | Fitzgerald et al. |
| 10,909,673 | B2 | 2/2021 | Forutanpour et al. |
| 10,977,700 | B2 | 4/2021 | Bordeleau et al. |
| 11,080,662 | B2 | 8/2021 | Bowles et al. |
| 11,080,672 | B2 | 8/2021 | Bowles |
| 11,107,046 | B2 | 8/2021 | Bowles |
| 11,126,973 | B2 | 9/2021 | Silva et al. |
| 11,210,777 | B2 | 12/2021 | Fitzgerald et al. |
| 11,232,412 | B2 | 1/2022 | Hunt et al. |
| 11,341,471 | B2 | 5/2022 | Dion et al. |
| 11,436,570 | B2 | 9/2022 | Bowles et al. |
| 11,443,289 | B2 | 9/2022 | Bowles et al. |
| 11,482,067 | B2 | 10/2022 | Forutanpour et al. |
| 11,526,932 | B2 | 12/2022 | Bowles et al. |
| 11,687,900 | B2 | 6/2023 | Dion et al. |
| 11,688,222 | B2 | 6/2023 | Dion et al. |
| 11,704,887 | B2 | 7/2023 | Saunders et al. |
| 2002/0009220 | A1 | 1/2002 | Tanaka |
| 2002/0128790 | A1 | 9/2002 | Woodmansee |
| 2004/0125208 | A1 | 7/2004 | Malone et al. |
| 2004/0207836 | A1 | 10/2004 | Chhibber et al. |
| 2004/0254677 | A1 | 12/2004 | Brogardh et al. |
| 2005/0146719 | A1 | 7/2005 | Chhibber et al. |
| 2005/0167620 | A1 | 8/2005 | Cho et al. |
| 2005/0193027 | A1 | 9/2005 | Hasegawa et al. |
| 2006/0007177 | A1 | 1/2006 | Mclintock |
| 2006/0120588 | A1 | 6/2006 | Kwon et al. |
| 2007/0205751 | A1 | 9/2007 | Suzuki et al. |
| 2007/0289673 | A1 | 12/2007 | Lacroix et al. |
| 2009/0249443 | A1 | 10/2009 | Fitzgerald et al. |
| 2009/0253406 | A1 | 10/2009 | Fitzgerald et al. |
| 2010/0053604 | A1 | 3/2010 | Rice |
| 2010/0169231 | A1 | 7/2010 | Bowles et al. |
| 2010/0228676 | A1 | 9/2010 | Librizzi et al. |
| 2011/0043798 | A1 | 2/2011 | Markwort et al. |
| 2012/0029947 | A1 | 2/2012 | Wooldridge et al. |
| 2012/0237908 | A1 | 9/2012 | Fitzgerald et al. |
| 2012/0280934 | A1 | 11/2012 | Ha et al. |
| 2013/0046611 | A1 | 2/2013 | Bowles et al. |
| 2013/0046699 | A1 | 2/2013 | Bowles et al. |
| 2013/0121463 | A1 | 5/2013 | Nesch et al. |
| 2013/0124426 | A1 | 5/2013 | Bowles et al. |
| 2013/0144797 | A1 | 6/2013 | Bowles et al. |
| 2013/0154842 | A1 | 6/2013 | Chishima |
| 2013/0162548 | A1 | 6/2013 | Chen et al. |
| 2013/0191236 | A1 | 7/2013 | Bowles |
| 2013/0198089 | A1 | 8/2013 | Bowles |
| 2013/0269013 | A1 | 10/2013 | Parry et al. |
| 2013/0311318 | A1 | 11/2013 | Librizzi et al. |
| 2014/0253494 | A1 | 9/2014 | Jiang et al. |
| 2014/0267691 | A1 | 9/2014 | Humphrey et al. |
| 2014/0313144 | A1 | 10/2014 | Seto et al. |
| 2015/0046343 | A1 | 2/2015 | Martini |
| 2015/0082410 | A1 | 3/2015 | Fitzgerald et al. |
| 2015/0116481 | A1 | 4/2015 | Troy et al. |
| 2015/0123987 | A1 | 5/2015 | Hong et al. |
| 2015/0206200 | A1 | 7/2015 | Edmondson et al. |
| 2015/0309912 | A1 | 10/2015 | Nguyen et al. |
| 2015/0324926 | A1 | 11/2015 | Nguyen et al. |
| 2015/0339736 | A1 | 11/2015 | Bennett |
| 2016/0019685 | A1 | 1/2016 | Nguyen |
| 2016/0055778 | A1 | 2/2016 | Kim |
| 2016/0171456 | A1 | 6/2016 | Bowles |
| 2016/0225036 | A1 | 8/2016 | Nguyen |
| 2016/0275460 | A1 | 9/2016 | Ploetner et al. |
| 2016/0307309 | A1 | 10/2016 | Nguyen et al. |
| 2016/0335616 | A1 | 11/2016 | Bordeleau et al. |
| 2017/0023637 | A1 | 1/2017 | Yang et al. |
| 2017/0024613 | A1 | 1/2017 | Shivaram et al. |
| 2017/0056928 | A1 | 3/2017 | Torrione |
| 2017/0091557 | A1 | 3/2017 | Wong et al. |
| 2017/0167986 | A1 | 6/2017 | Nguyen et al. |
| 2017/0195069 | A1 | 7/2017 | Slavin |
| 2017/0256051 | A1 | 9/2017 | Dwivedi et al. |
| 2017/0315007 | A1 | 11/2017 | Fitzgerald et al. |
| 2017/0344884 | A1 | 11/2017 | Lin et al. |
| 2017/0372465 | A1 | 12/2017 | Forutanpour et al. |
| 2018/0165541 | A1 | 6/2018 | Amico et al. |
| 2018/0218271 | A1 | 8/2018 | Rao et al. |
| 2018/0232875 | A1 | 8/2018 | Kanodia et al. |
| 2018/0342050 | A1 | 11/2018 | Fitzgerald et al. |
| 2018/0370027 | A1 | 12/2018 | Oota et al. |
| 2019/0073641 | A1 | 3/2019 | Utke |
| 2019/0184582 | A1 | 6/2019 | Namiki |
| 2019/0266720 | A1 | 8/2019 | Dwivedi et al. |
| 2019/0277769 | A1 | 9/2019 | Nguyen et al. |
| 2019/0318465 | A1* | 10/2019 | Nguyen ............... B65G 47/248 |
| 2019/0354298 | A1 | 11/2019 | Öberg et al. |
| 2019/0385275 | A1 | 12/2019 | Kikuchi |
| 2020/0130963 | A1 | 4/2020 | Diankov et al. |
| 2020/0167907 | A1 | 5/2020 | Yan et al. |

(56) References Cited

U.S. PATENT DOCUMENTS

| 2020/0202369 | A1 |   | 6/2020  | Datta               |
| 2020/0265487 | A1 |   | 8/2020  | Silva et al.        |
| 2021/0001488 | A1 |   | 1/2021  | Birkmeyer et al.    |
| 2021/0081351 | A1 |   | 3/2021  | Villareal et al.    |
| 2021/0110440 | A1 |   | 4/2021  | Dion et al.         |
| 2021/0192484 | A1 |   | 6/2021  | Forutanpour et al.  |
| 2022/0051507 | A1 |   | 2/2022  | Forutanpour et al.  |
| 2022/0067798 | A1 |   | 3/2022  | Forutanpour et al.  |
| 2022/0114854 | A1 |   | 4/2022  | Forutanpour et al.  |
| 2022/0164833 | A1 |   | 5/2022  | Dion et al.         |
| 2022/0198407 | A1 |   | 6/2022  | Beane et al.        |
| 2022/0262189 | A1 |   | 8/2022  | Dion et al.         |
| 2022/0366558 | A1 |   | 11/2022 | Bufi et al.         |
| 2023/0007937 | A1 |   | 1/2023  | Forutanpour et al.  |
| 2023/0173676 | A1 |   | 6/2023  | Lonsberry et al.    |
| 2023/0360353 | A1 |   | 11/2023 | Saunders et al.     |
| 2024/0013246 | A1 |   | 1/2024  | Dion et al.         |
| 2025/0086341 | A1 |   | 3/2025  | Abe et al.          |

FOREIGN PATENT DOCUMENTS

| EP | 3427198       | B1 |   | 7/2020  |
| EP | 3731157       | A1 |   | 10/2020 |
| EP | 4238328       | A1 |   | 9/2023  |
| ES | 2819699       | T3 |   | 4/2021  |
| ES | 2820230       | T3 |   | 4/2021  |
| JP | H01-112382    | A  |   | 5/1989  |
| JP | 2001-264268   | A  |   | 9/2001  |
| JP | 2004-251781   | A  |   | 9/2004  |
| JP | 2008-127029   | A  |   | 6/2008  |
| JP | 2009-032112   | A  |   | 2/2009  |
| JP | 2010-066186   | A  |   | 3/2010  |
| JP | 2012-090231   | A  |   | 5/2012  |
| JP | 2013-114049   | A  |   | 6/2013  |
| JP | 2013-531823   | A  |   | 8/2013  |
| JP | 2015-513135   | A  |   | 4/2015  |
| JP | 2020-126661   | A  |   | 8/2020  |
| JP | 6754843       | B2 |   | 9/2020  |
| KR | 10-2019-0107593 | A |  | 9/2019 |
| KR | 20190107593   | A  | * | 9/2019  |
| KR | 10-2019-0116876 |   |   | 10/2019 |
| KR | 10-2020-0115308 | A |   | 10/2020 |
| WO | 2013/116256   | A1 |   | 8/2013  |
| WO | 2017/081527   | A1 |   | 5/2017  |
| WO | 2017/156046   | A1 |   | 9/2017  |
| WO | 2019/012505   | A1 |   | 1/2019  |

OTHER PUBLICATIONS

U.S. Appl. No. 17/141,919, filed Jan. 5, 2021, U.S. Pat. No. 11,580,627, Issued.

English Translation of JP Office Action dated Nov. 19, 2024 for JP Application No. 2022541874, 6 page(s).

JP Office Action Mailed on Nov. 19, 2024 for JP Application No. 2022541874, 6 page(s).

Bian, Xiao et al., Multiscale Fully Convolutional Network with Application to Industrial Inspection, 2016 IEEE Winter Conference on Applications of Computer Vision (WACV), IEEE, Mar. 7, 2016, pp. 1-8.

Du-Ming Tsai et al., Low-contrast surface inspection of mura defects in liquid crystal displays using optical flow-based motion analysis, Machine Vision and Applications, Springer, Berlin, DE vol. 22, No. 4, Mar. 31, 2010 (Mar. 31, 2020), pp. 629-649, XP019917678, ISSN: 1432-1759, DOI: 10.1007/S00138-010-0256-1.

English language translation of KR patent publication 10-2019-0107593, dated Oct. 7, 2020.

English language translation of KR patent publication 10-2019-0107593, dated Sep. 20, 2019.

English Translation of CA Office Action dated Nov. 28, 2023 for CA Application No. 3163948, 3 page(s).

Extended European Search Report Mailed on Dec. 15, 2023 for EP Application No. 21738603, 12 page(s).

International Search Report and Written Opinion from corresponding WO application PCT/US2021/012338, dated Mar. 24, 2021.

Kumkang Systems Co., Ltd. (hereinafter Kumkang), KR patent publication English language translation of KR patent publication (10-2019-0107593).

Yuan Lunxi et al., The Development and Prospect of Surface Defect Detection Based on Vision Measurement Method, 2016 12th World Congress on Intelligent Control and Automation (WCICA), IEEE, Jun. 12, 2016, pp. 1382-1387.

Zhang Lei et al., Road Crack Detection Using Deep Convolutional Neural Network, 2016 IEEE International Conference on Image Processing (ICIP), IEEE, Sep. 25, 2016, pp. 3708-3712.

ISA/220—Notification of Transmittal or Search Report and Written Opinion of the ISA, or the Declaration Mailed on Apr. 2, 2025 for WO Application No. PCT/US24/059857, 17 page(s).

Schrimpf, Johannes et al., "Real-Time System Integration in a Multi-Robot Sewing Cell,", Oct. 7, 2012, 2012 IEEE/RSJ International Conference on Intelligent Robots and Systems, 2724-2729.

Schrimpf, Johannes et al., "Work Flow, Material Handling and Initial Part Positioning in a Multi-Robot Sewing Cell,", Jan. 1, 2015, IFAC-PAPERSONLINE, 45-50, 48, No. 19.

Schrimph, Johannes et al., "Model-Based Feed-Forward and Setpoint Generation in a Multi-Robot Sewing Cell,", May 26, 2015, IEEE International Conference on Robotics and Automation, 2027-2033.

Non-Final Rejection Mailed on Dec. 10, 2025 for U.S. Appl. No. 18/794,667, 49 page(s).

* cited by examiner

Figure 17:
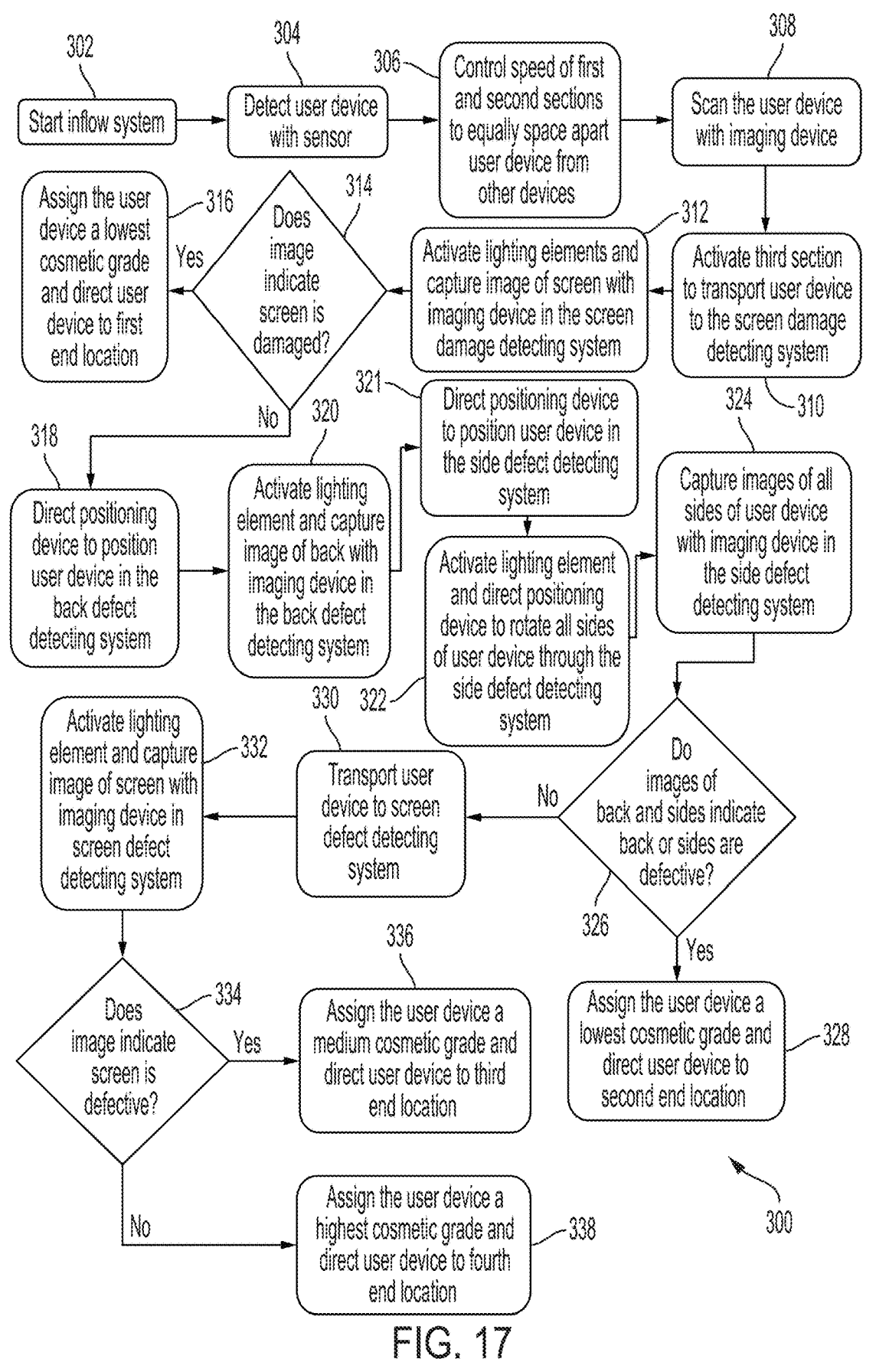

302 — Start inflow system

304 — Detect user device with sensor

306 — Control speed of first and second sections to equally space apart user device from other devices 308 — Scan the user device with imaging device 310 — Activate third section to transport user device to the screen damage detecting system 312 — Activate lighting elements and capture image of screen with imaging device in the screen damage detecting system 314 — Does image indicate screen is damaged?

316 — Assign the user device a lowest cosmetic grade and direct user device to first end location Yes No 318 — Direct positioning device to position user device in the back defect detecting system 320 — Activate lighting element and capture image of back with imaging device in the back defect detecting system 321 — Direct positioning device to position user device in the side defect detecting system 322 — Activate lighting element and direct positioning device to rotate all sides of user device through the side defect detecting system 324 — Capture images of all sides of user device with imaging device in the side defect detecting system 326 — Do images of back and sides indicate back or sides are defective?

No

Yes

328 — Assign the user device a lowest cosmetic grade and direct user device to second end location 330 — Transport user device to screen defect detecting system 332 — Activate lighting element and capture image of screen with imaging device in screen defect detecting system 334 — Does image indicate screen is defective?

Yes

No

336 — Assign the user device a medium cosmetic grade and direct user device to third end location 338 — Assign the user device a highest cosmetic grade and direct user device to fourth end location

SYSTEMS AND METHODS FOR AUTOMATICALLY GRADING PRE-OWNED ELECTRONIC DEVICES

CROSS REFERENCE TO RELATED APPLICATIONS

This application is a continuation of U.S. application Ser. No. 18/153,804 filed Jan. 12, 2023, titled "SYSTEMS AND METHODS FOR AUTOMATICALLY GRADING PRE-OWNED ELECTRONIC DEVICES," which is a continuation of U.S. application Ser. No. 17/141,919 filed Jan. 5, 2021, titled "SYSTEMS AND METHODS FOR AUTO-MATICALLY GRADING PRE-OWNED ELECTRONIC DEVICES," which claims priority to U.S. Application No. 62/957,795 filed Jan. 6, 2020, titled "SYSTEMS AND METHODS FOR AUTOMATICALLY GRADING PRE-OWNED ELECTRONIC DEVICES," the contents of each of which are incorporated herein by reference in their entirety.

FIELD

The present invention relates generally to grading pre-owned electronic devices. More particularly, the present invention relates to systems and methods for automatically grading pre-owned electronic devices.

BACKGROUND

Known systems and methods for grading pre-owned electronic devices employ manual labor to inspect, sort, and grade the pre-owned electronic devices for either resale or recycling. However, extensive use of such manual labor can be costly, slow, and inaccurate. Additionally, such known systems and methods often fail to capture high quality and/or standardized images of the pre-owned electronic devices, which can prolong and frustrate customer quality disputes.

In view of the above, there is a need and an opportunity for improved systems and methods.

BRIEF DESCRIPTION OF THE DRAWINGS

FIG. 17 is a flow diagram of a method according to disclosed embodiments.

DETAILED DESCRIPTION

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Figure 1:
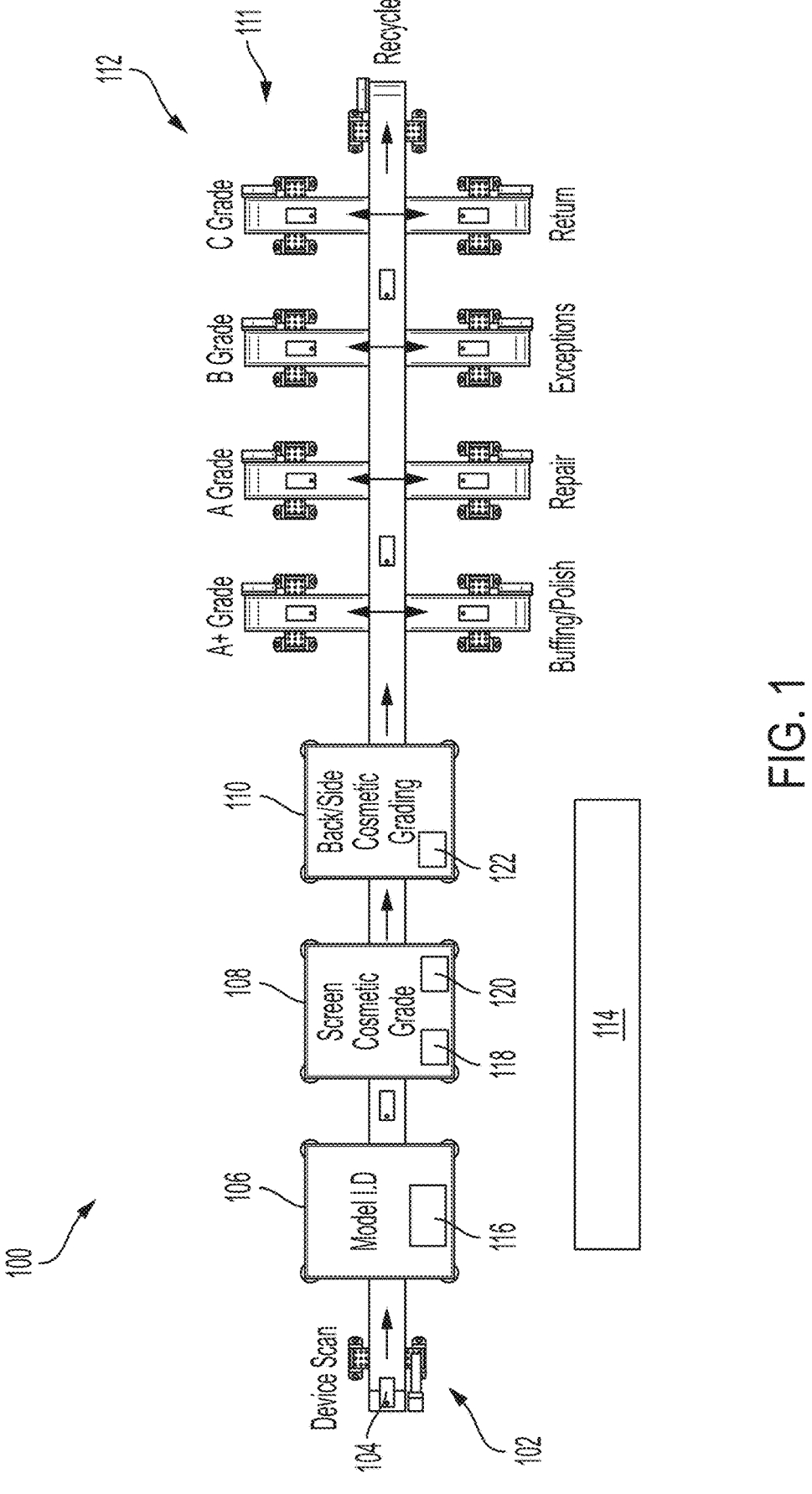
FIG. 1 is a schematic diagram of a multi-stage automated assembly line system according to disclosed embodiments.

Embodiments disclosed herein can include systems and methods for automatically grading pre-owned electronic devices or other user devices, such as, for example, mobile phones. As seen in FIG. 1, in some embodiments, systems and methods disclosed herein can include a multi-stage automated assembly line system 100 that can sort and grade the pre-owned electronic devices.

As also seen in FIG. 1, in some embodiments, the multi-stage automated assembly line system 100 can include multiple assembly line stations, systems, and/or devices for executing one or more tasks to grade the pre-owned electronic devices. For example, in some embodiments, a first station 102 of the multiple assembly line stations can scan a bar code, a QR code, or the like associated with one of the pre-owned electronic devices 104, a second station 106 of the multiple assembly line stations can identify a model ID of the one of the pre-owned electronic devices 104, a third station 108 of the multiple assembly line stations can grade a screen and/or a camera of the one of the pre-owned electronic devices 104, a fourth station 110 of the multiple assembly line stations can grade a back and/or sides of the one of the pre-owned electronic devices 104, and a sorting station 111 of the multiple assembly line stations can distribute the one of the pre-owned electronic devices 104 to one of a plurality of output stations 112 based on assessments in or from some or all of the multiple assembly line stations.

Various systems and methods for moving the pre-owned electronic devices through the multi-stage automated assembly line system 100 are contemplated. For example, in some embodiments, conveyor belts as known in the art can move the pre-owned electronic devices through the multi-stage automated assembly line system 100, and in some embodiments, a movable tote can move the pre-owned electronic devices through the multi-stage automated assembly line system 100.

As described above, the first station 102 can scan the bar code or another electronic identifier associated with the one of the pre-owned electronic devices 104, for example, with a scanning device. When the bar code or the other electronic identifier is scanned, control circuitry 114 of the multi-stage automated assembly line system 100 in communication with the first station 102 can identify and load preliminary information associated with the one of the pre-owned electronic devices 104 from the bar code or the other electronic identifier. In some embodiments, the preliminary information associated with the one of the pre-owned electronic devices 104 can include a manufacturer of the one of the pre-owned electronic devices 104, a customer ID associated with the one of the pre-owned electronic devices 104, usage data for the one of the pre-owned electronic devices 104, a model of the one of the pre-owned electronic devices 104, a provisional grade for the one of the pre-owned electronic devices 104, and/or other types of information as would be known or desired by one of ordinary skill in the art. Furthermore, in some embodiments, others of the multiple assembly line stations can subsequently add to and/or augment the preliminary information associated with the one of the pre-owned electronic devices 104. For example, in some embodiments, responsive to the first station 102 scanning the bar code or the other electronic identifier, the control circuitry 114 can generate a database entry in a database that initially contains the preliminary information associated with the one of the pre-owned electronic devices 104, that is, the preliminary information identified from the bar code or the other electronic identifier, and the others of the multiple assembly line stations can save additional information associated with the one of the pre-owned electronic devices 104 into the database entry.

As described above, the second station 106 can identify the model ID of the one of the pre-owned electronic devices 104. For example, in some embodiments, the control circuitry 114 in communication with the second station 106 can use the preliminary information associated with the one of the pre-owned electronic devices 104 to identify the manufacturer and/or the model of the one of the pre-owned electronic devices 104 and, responsive thereto, identify a set of possible options for the model ID of the one of the pre-owned electronic devices 104.

Various embodiments for identifying the manufacturer, the model, and/or the model ID of the one of the pre-owned electronic devices 104 are contemplated. For example, in some embodiments, the first station 102 or the second station 106 can include an imaging device 116 that can capture a first image of the one of the pre-owned electronic devices 104, and the control circuitry 114 can process the first image of the one of the pre-owned electronic devices 104 to identify the manufacturer, the model, and/or the model ID of the one of the pre-owned electronic devices 104. In some embodiments, the control circuitry 114 can compare the first image of the one of the pre-owned electronic devices 104 to a first series of pre-stored reference images for which the manufacturer, the model, and/or the model ID is known, can identify one of the first series of pre-stored reference images that best matches the first image of the one of the pre-owned electronic devices 104, and can assign to the one of the pre-owned electronic devices 104 the manufacturer, the model, and/or the model ID associated with the one of the first series of pre-stored reference images that best matches the first image of the one of the pre-owned electronic devices 104.

Additionally or alternatively, in some embodiments, the control circuitry 114 can parse the first image of the one of the pre-owned electronic devices 104 to identify visual identifying details of the one of the pre-owned electronic devices 104, such as a size of the one of the pre-owned electronic devices 104, a location of the screen of the one of the pre-owned electronic devices 104, and locations and sizes of other elements of the one of the pre-owned electronic devices 104, such as cameras and buttons. Then, the control circuitry 114 can compare the visual identifying details to identifying information of known electronic devices to identify the manufacturer, the model, and/or the model ID of the one of the pre-owned electronic devices 104.

Additionally or alternatively, in some embodiments, the control circuitry 114 can execute a device recognition artificial intelligence ("AI") program or algorithm to identify the manufacturer, the model, and/or the model ID of the one of the pre-owned electronic devices 104. For example, in a training mode, the device recognition AI program or algorithm can be trained to identify the pre-owned electronic devices, for example, by feeding the device recognition AI program or algorithm with captured images, sensor scan data, and/or the identifying information of the known electronic devices and, responsive thereto, provide positive and negative feedback for device identifications made by the device recognition AI program or algorithm. Based on the positive and negative feedback, the device recognition AI program or algorithm can develop rules and heuristics that can be used to identify the manufacturer, the model, and/or the model ID of one of the pre-owned electronic devices 104 when operating outside of a training mode.

As described above, the third station 108 can grade the screen and/or the camera of the one of the pre-owned electronic devices 104, for example, by determining whether or to what degree the screen and/or a lens of the camera of the one of the pre-owned electronic devices 104 is cracked. In some embodiments, the control circuitry 114 in communication with the third station 108 can use the preliminary information associated with the one of the pre-owned electronic devices 104 and the manufacturer, the model, and/or the model ID of the one of the pre-owned electronic devices 104 to grade the screen and/or the camera of the one of the pre-owned electronic devices 104. For example, in some embodiments, the control circuitry 114 can use the manufacturer, the model, and/or the model ID of the one of the pre-owned electronic devices 104 to transmit instructions for the third station 108 or positioning elements therein to position lighting elements 118 and an imaging device 120 associated with the third station 108 and adjust parameters of the lighting elements 118 and the imaging device 120 so that any cracks in the screen and/or the lens of the camera of the one of the pre-owned electronic devices 104 can be identified without powering on the one of the pre-owned electronic devices 104 and so that an area of the one of the pre-owned electronic devices 104 that the imaging device 120 captures is limited to only that area needed to identify such cracks.

Various embodiments of the lighting elements 118 are contemplated. For example, in some embodiments, the lighting elements 118 can include ultraviolet light emitting elements. Additionally or alternatively, in some embodiments, the lighting elements 118 can include non-ultraviolet lighting elements that can be used independently or in connection with the ultraviolet light emitting elements. Additionally or alternatively, in some embodiments, the lighting elements 118 can include multiple, for example, three, separate light elements with variable intensities that can be adjusted by the control circuitry 114 based on the manufacturer, the model, and/or the model ID of the one of the pre-owned electronic devices 104. For example, a first of the lighting elements 118 can include a large planar lighting element positioned at an angle with respect to a section of the conveyor belt or the movable tote within the third station 108 and closest to a first end at which the one of the pre-owned electronic devices 104 enters the third station 108. Then, a second of the lighting elements 118 can be positioned below the conveyor belt or the movable tote, include a width greater than the conveyor belt or the movable tote, and be used to illuminate the one of the pre-owned electronic devices 104 from below, and in these embodiments, the conveyor belt or the movable tote can be at least partially transparent. Finally, a third of the lighting elements 118 can be vertically closer to the conveyor belt or the movable tote than the first of the lighting elements 118 at an opposite end of the third station 108 from the first of the lighting elements 118.

In some embodiments, different configurations and numbers of the lighting elements 118 can be employed in the third station 108. For example, in some embodiments, a physical configuration, optical characteristics, and timing characteristics of the lighting elements 118 can be altered and optimized for use in connection with different screen types of the pre-owned electronic devices, such as LED-type screens, to facilitate optimized accuracy, for example, greater than 98% accuracy, when grading the screen of the one of the pre-owned electronic devices 104. In particular, the control circuitry 114 can account for changes to and optimizations of polarization patterns, refraction anomalies, exposure rates, and speeds of the lighting elements 118 to facilitate increased production rates when identifying the cracks in the LED-type screens versus LCD-type screens.

Various embodiments for grading the screen and/or the camera of the one of the pre-owned electronic devices 104 are contemplated. For example, in some embodiments, the imaging device 120 can capture a second image of the one of the pre-owned electronic devices 104 while the lighting elements 118 are illuminating the one of the pre-owned electronic devices 104, and the control circuitry 114 can process the second image of the one of the pre-owned electronic devices 104 to identify the cracks in the screen or the lens of the camera of the one of the pre-owned electronic devices 104. In some embodiments, the control circuitry 114 can compare the second image of the one of the pre-owned electronic devices 104 to a second series of pre-stored reference images for which the manufacturer, the model, and/or the model ID matches the manufacturer, the model, and/or the model ID of the one of the pre-owned electronic devices 104, and in these embodiments, each of the second series of pre-stored reference images can include a cracked screen, a cracked camera lens, an uncracked screen, an uncracked camera lens, and combinations thereof. Based on such a comparison, the control circuitry 114 can identify one of the second series of pre-stored references images that best matches the second image of the one of the pre-owned electronic devices 104 and grade the screen and/or the camera of the one of the pre-owned electronic devices 104 based on how closely the second image of the one of the pre-owned electronic devices 104 matches different ones of the second series pre-stored references images.

Additionally or alternatively, in some embodiments, the control circuitry 114 can parse the second image of the one of the pre-owned electronic devices 104 to identify visual characteristics consistent with the screen and/or the lens of the camera of the one of the pre-owned electronic devices 104 being cracked. Then, the control circuitry 114 can compare the visual characteristics to stored information indicative of screens and/or lens of cameras being cracked to identify whether or to what degree the screen and/or the lens of the camera of the one of the pre-owned electronic devices 104 is cracked and, based thereon, grade the screen and/or the camera of the one of the pre-owned electronic devices 104.

Additionally or alternatively, in some embodiments, the control circuitry 114 can execute a screen grading AI program or algorithm to grade the screen and/or the camera of the one of the pre-owned electronic devices 104. For example, in the training mode, the screen grading AI program or algorithm can be trained to identify the cracks in and corresponding grades of the pre-owned electronic devices, for example, by feeding the screen grading AI program or algorithm with the captured images, the sensor scan data, and/or the identifying information of the known electronic devices with varying grades and different combinations and degrees of the screens and/or the lenses of the cameras being cracked and, responsive thereto, provide the positive and negative feedback for screen and camera grades assigned by the screen grading AI program or algorithm. Based on the positive and negative feedback, the screen grading AI program or algorithm can develop rules and heuristics that can be used to grade the screen and/or the camera of the one of the pre-owned electronic devices 104 when operating outside of the training mode.

Additionally or alternatively, the third station 108 can grade the screen and/or the camera of the one of the pre-owned electronic devices 104 based on an amount of cosmetic wear identified on a front face of the one of the pre-owned electronic devices 104 that is distinct from or short of full ones of the cracks in the screen and/or the lens of the camera of the one of the pre-owned electronic devices 104.

As described above, the fourth station 110 can grade the back and/or the sides of the one of the pre-owned electronic devices 104. In some embodiments, the one of the pre-owned electronic devices 104 can be rotated so that, when the back is facing in one direction, such as downwards, while the one of the pre-owned electronic devices 104 is in the first station 102, the second station 106, and/or the third station 104, the back is rotated to face in a second direction, such as upwards, that is opposite the first direction while the one of the pre-owned electronic devices 104 is in the fourth station 110. As such, in some embodiments, the control circuitry 114 in communication with the fourth station 110 can use the preliminary information associated with the one of the pre-owned electronic devices 104 and the manufacturer, the model, and/or the model ID of the one of the pre-owned electronic devices 104 to grade the back and/or the sides of the one of the pre-owned electronic devices 104. For example, in some embodiments, the control circuitry 114 can use the manufacturer, the model, and/or the model ID of the one of the pre-owned electronic devices 104 to transmit instructions to the fourth station 110 or the positioning elements therein to position an imaging device 122 associated with the fourth station 110 so that the area of the one of the pre-owned electronic devices 104 that the imaging device 122 captures is limited to only that area needed for such grading.

Various embodiments for grading the back and/or the sides of the one of the pre-owned electronic devices 104 are contemplated. For example, in some embodiments, the imaging device 122 can capture a third image of the one of the pre-owned electronic devices 104, and the control circuitry 114 can process the third image of the one of the pre-owned electronic devices 104. In some embodiments, the control circuitry 114 can compare the third image of the one of the pre-owned electronic devices 104 to a third series of pre-stored reference images for which the manufacturer, the model, and/or the model ID matches the manufacturer, the model, and/or the model ID of the one of the pre-owned electronic devices 104, and in these embodiments, each of the third series of pre-stored reference images can include a varying degree of wear or other cosmetic damage. Based on such a comparison, the control circuitry 114 can identify one of the third series of pre-stored references images that best matches the third image of the one of the pre-owned electronic devices 104 and grade the back and/or the sides of the one of the pre-owned electronic devices 104 based on how closely the third image of the one of the pre-owned electronic devices 104 matches different ones of the third series of pre-stored references images. In some embodiments, the imaging device 122, alone or using multiple imaging devices in communication there with, can capture one image of the back of the one of the pre-owned electronic devices 104 and another image of the sides of the one of the pre-owned electronic devices 104.

Additionally or alternatively, in some embodiments, the control circuitry 114 can parse the third image of the one of the pre-owned electronic devices 104 to identify the visual characteristics consistent with cosmetic damage, such as cracks, dents, and/or scratches. Then, the control circuitry 114 can compare the visual characteristics to the stored information indicative of backs and/or sides of the pre-owned electronic devices with the cosmetic damage to identify whether and to what degree the back and/or the sides of the one of the pre-owned electronic devices 104 includes the cosmetic damage and, based thereon, grade the back and/or the sides of the one of the pre-owned electronic devices 104.

Additionally or alternatively, in some embodiments, the control circuitry 114 can execute a back and side grading AI program or algorithm to grade the cosmetic damage of the back and/or the sides of the one of the pre-owned electronic devices 104. For example, in the training mode, the back and side grading AI program or algorithm can be trained to identify the cosmetic damage in and the corresponding grades of the pre-owned electronic devices, for example, by feeding the back and side grading AI program or algorithm with the captured images, the sensor scan data, and/or the identifying information of the known electronic devices with varying grades and different combinations and degrees of the cosmetic damage and, responsive thereto, provide the positive and negative feedback for back and side grades assigned by the back and side grading AI program or algorithm. Based on the positive and negative feedback, the back and side grading AI program or algorithm can develop rules and heuristics that can be used to grade the back and/or the sides of the one of the pre-owned electronic devices 104 when operating outside of the training mode.

In some embodiments, any images captured by the multi-stage automated assembly line system 100 can be stored for future use in customer disputes. For example, in some embodiments, the control circuitry 114 can save the first image of the one of the pre-owned electronic devices 104 captured in the first station 102 or the second station 104, the second image of the one of the pre-owned electronic devices 104 captured in the third station 108, and/or the third image of the one of the pre-owned electronic devices 104 captured in the fourth station 110 into the database entry generated by the first station 102.

As described above, the sorting station 111 can distribute the one of the pre-owned electronic devices 104 to the one of the plurality of output stations 112 based on the assessments in or from the first station 102, the second station 106, the third station 108, and the fourth station 110. For example, the plurality of output stations 112 can include (1) a first output station for the pre-owned electronic devices in need of polishing or buffering, (2) a second output station for the pre-owned electronic devices in need of repair, (3) a third output station for the pre-owned electronic devices with specific exceptions, (4) a fourth output station for the pre-owned electronic devices that need to be returned, (5) a fifth output station for the pre-owned electronic devices that need to be recycled, and/or (6) other output stations for the pre-owned electronic devices that have been assigned an overall A+, A, B, or C grade.

While the control circuitry 114 is shown in the figures as separate and apart from other elements of the multi-stage automated assembly line system 100 it is to be understood that the control circuitry 118 can be integrated into and/or otherwise communicate with the other elements of the multi-stage automated assembly line system 100 so as to control and/or instruct the other elements of the multi-stage automated assembly line system 100 to execute methods described herein.

In this regard, the first station 102, the second station 106, the third station 108, the fourth station 110, the sorting station 111, and various sub-components thereof can be controlled by a single central processor or multiple processors coupled together. For example, each of the first station 102, the second station 106, the third station 108, the fourth station 110, the sorting station 111, and the various sub-components thereof can include a respective transceiver device and a respective memory device, each of which can be in communication with respective control circuitry, for example, the control circuitry 114, one or more respective programmable processors, and respective executable control software as would be understood by one of ordinary skill in the art. In some embodiments, the respective executable control software of each of the first station 102, the second station 106, the third station 108, the fourth station 110, the sorting station 111, and the various sub-components thereof can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the first station 102, the second station 106, the third station 108, the fourth station 110, the sorting station 111, and the various sub-components thereof can execute and control at least some of the methods described herein.

Figures 2, 3:
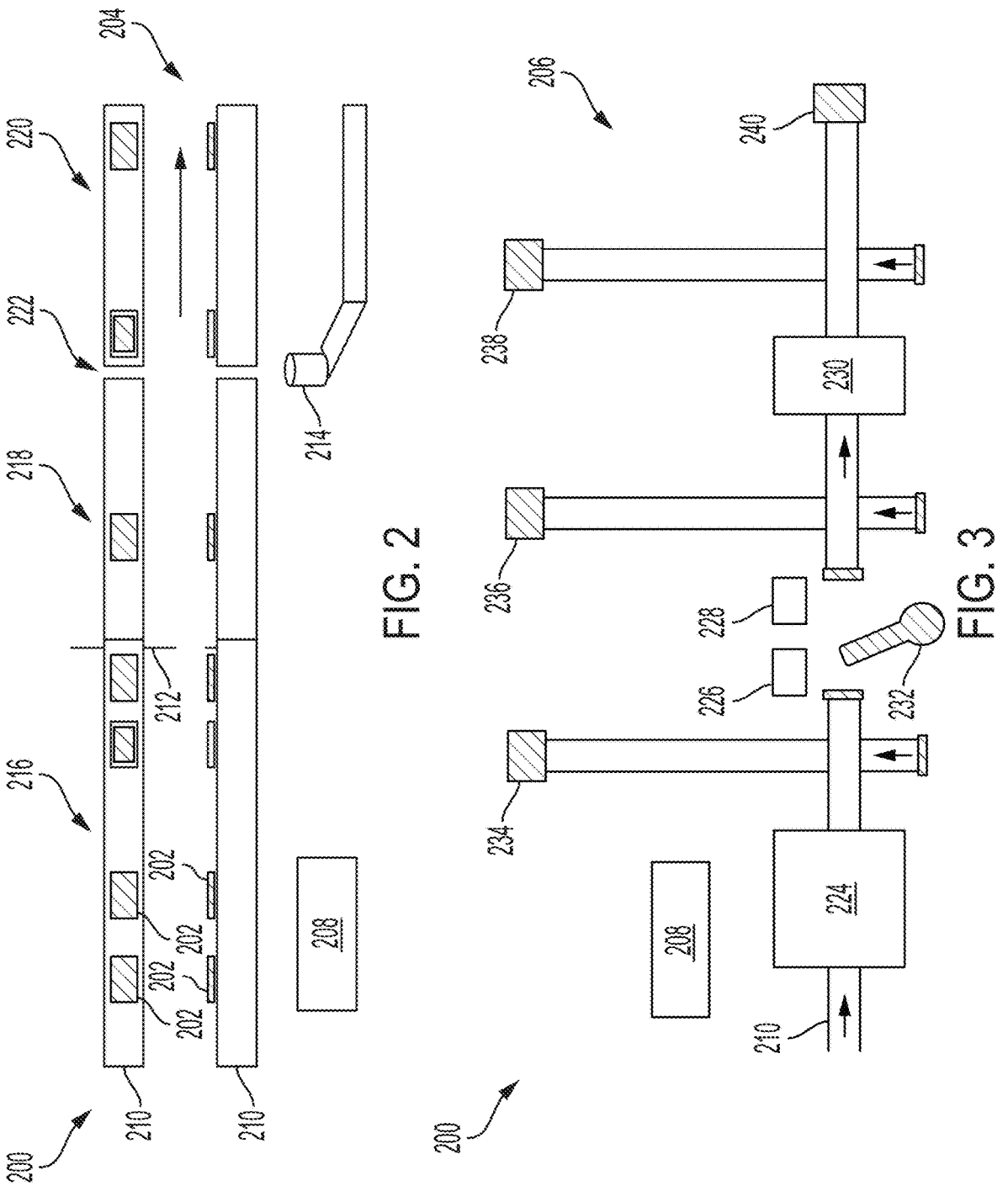
FIG. 2 is a schematic diagram of a portion of a multi-stage automated assembly line system according to disclosed embodiments.
FIG. 3 is a schematic diagram of a portion of a multi-stage automated assembly line system according to disclosed embodiments.

FIGS. 2-3 are schematic diagrams of another system 200 that can sort and grade the pre-owned electronic devices, such as a user device 202. As seen in FIGS. 2-3, the system 200 can include an inflow system 204, a grading and sorting system 206, control circuitry 208, and a platform 210 that can transport the user device 202 through the system 200.

As also seen in FIG. 2, in some embodiments, the inflow system 204 can include a sensor 212, for example, a photoelectric sensor, an imaging device 214, a first section 216 of the platform 210, a second section 218 of the platform 210, and a third section 220 of the platform 210. In some embodiments, the second section 218 can be located between the first section 216 and the third section 220 such that the sensor 212 can be located at an end of the first section 216 proximate to the second section 218 and such that a gap 222 can be located between the second section 218 and the third section 220 and within a field of view of the imaging device 214. In some embodiments, the gap 222 can be approximately 0.5 inches, and in some embodiments, the first section 216, the second section 218, and the third section 220 can include separate conveyor belts. In some embodiments, the user device 202 can include a data matrix label located on an exterior thereof, and in these embodiments, the imaging device 214 can scan the data matrix label to identify the user device 202 to the control circuitry 208.

As seen in FIG. 3, in some embodiments, the grading and sorting system 206 can include a screen damage detecting system 224, a back defect detecting system 226, a side defect detecting system 228, a screen defect detecting system 230, a positioning device 232, for example, a robotic arm, a first end location 234, a second end location 236, a third end location 238, and a fourth end location 240. In some embodiments, the first end location 234 can be dedicated for user devices having damaged screens, the second end location 236 can be dedicated for user devices having defective backs or defective sides, the third end location 238 can be dedicated for user devices having defective screens, and the fourth end location 240 can be dedicated for undamaged and non-defective user devices. However, in some embodiments, the second end location 236 can be dedicated for user devices having defective backs only, and in these embodiments, the grading and sorting system 206 can also include a fifth end location dedicated for user devices having defective sides.

Figure 4:
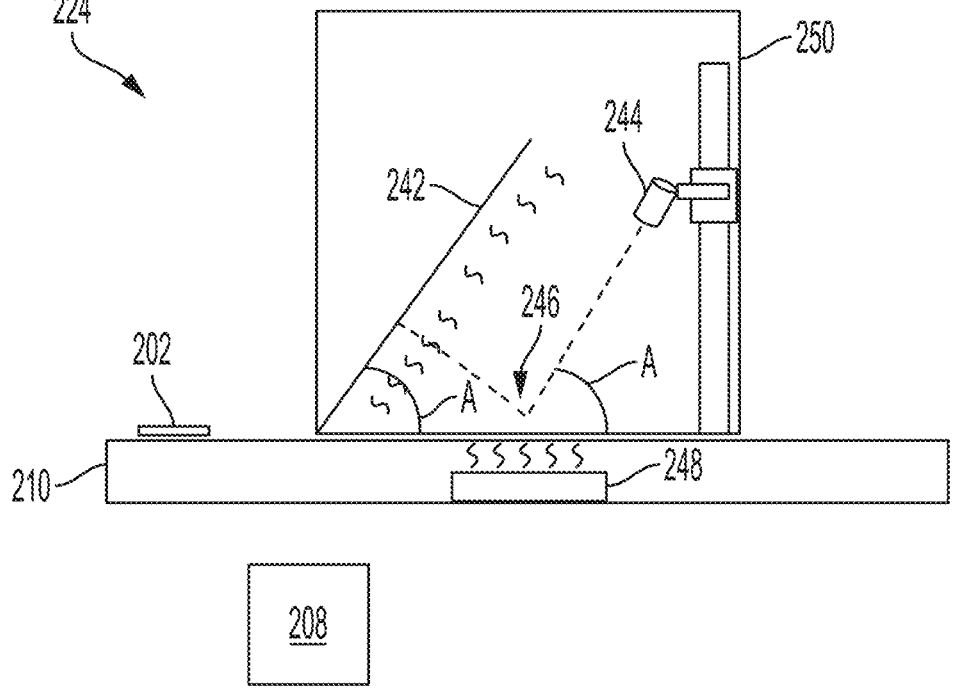
FIG. 4 is a schematic diagram of a screen damage detecting system according to disclosed embodiments.
Figure 5:
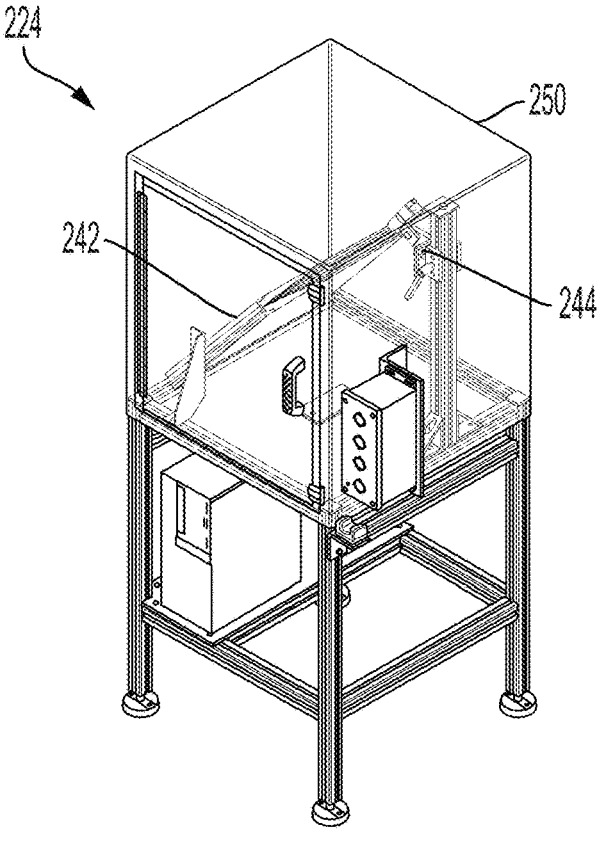
FIG. 5 is a perspective and partially transparent view of a screen damage detecting system according to disclosed embodiments.
Figure 6:
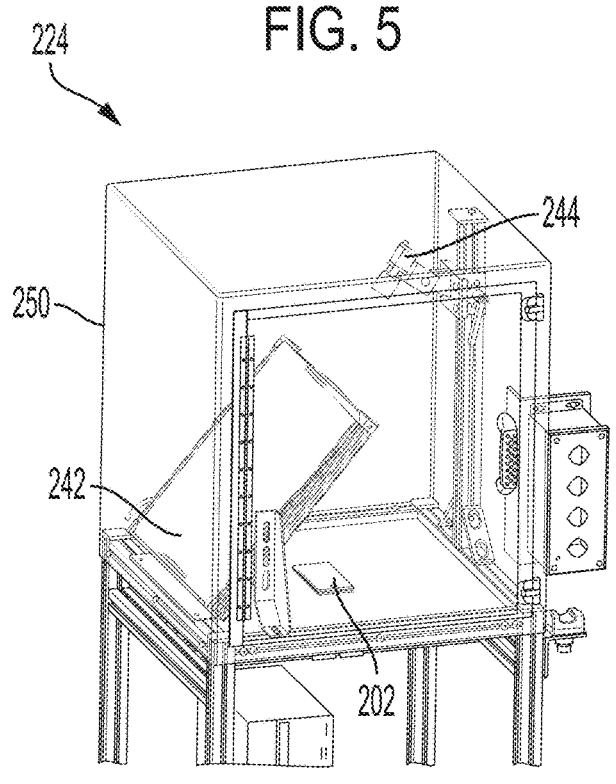
FIG. 6 is a perspective and partially transparent view of a screen damage detecting system according to disclosed embodiments.
Figure 7:
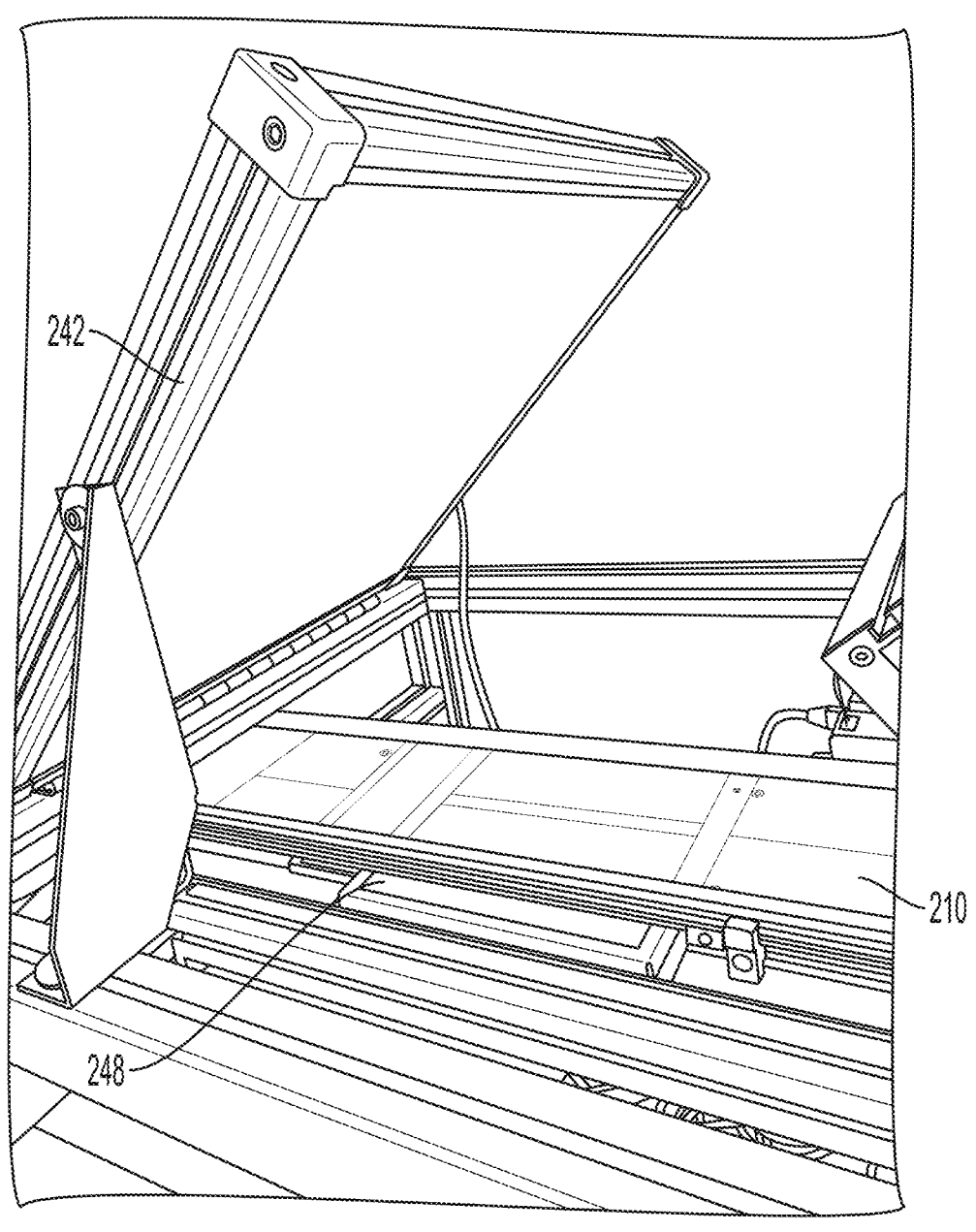
FIG. 7 is a view of an over conveyor belt light in a screen damage detecting system according to disclosed embodiments.
Figure 8:
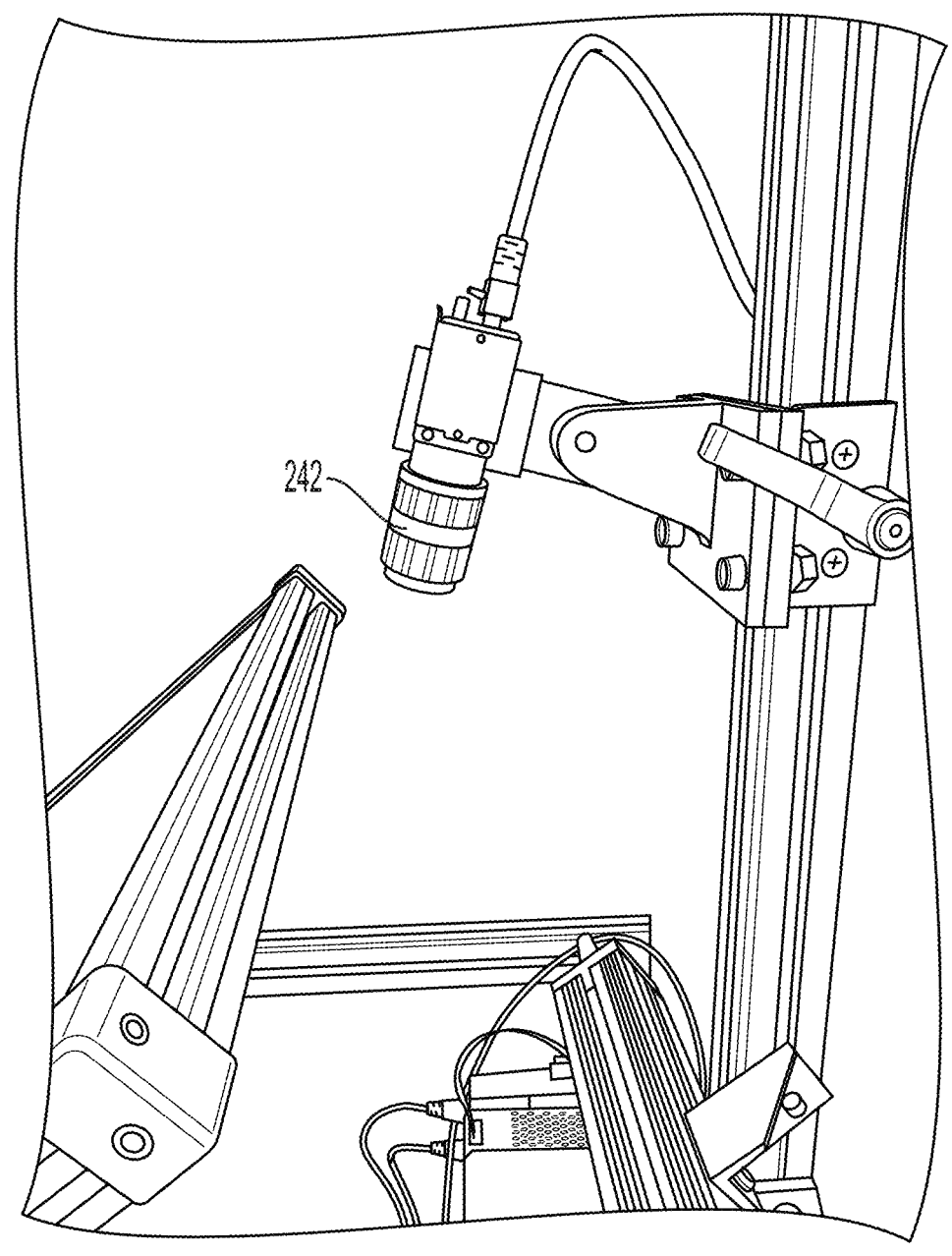
FIG. 8 is a view of an image capturing device in a screen damage detecting system according to disclosed embodiments.
Figure 9:
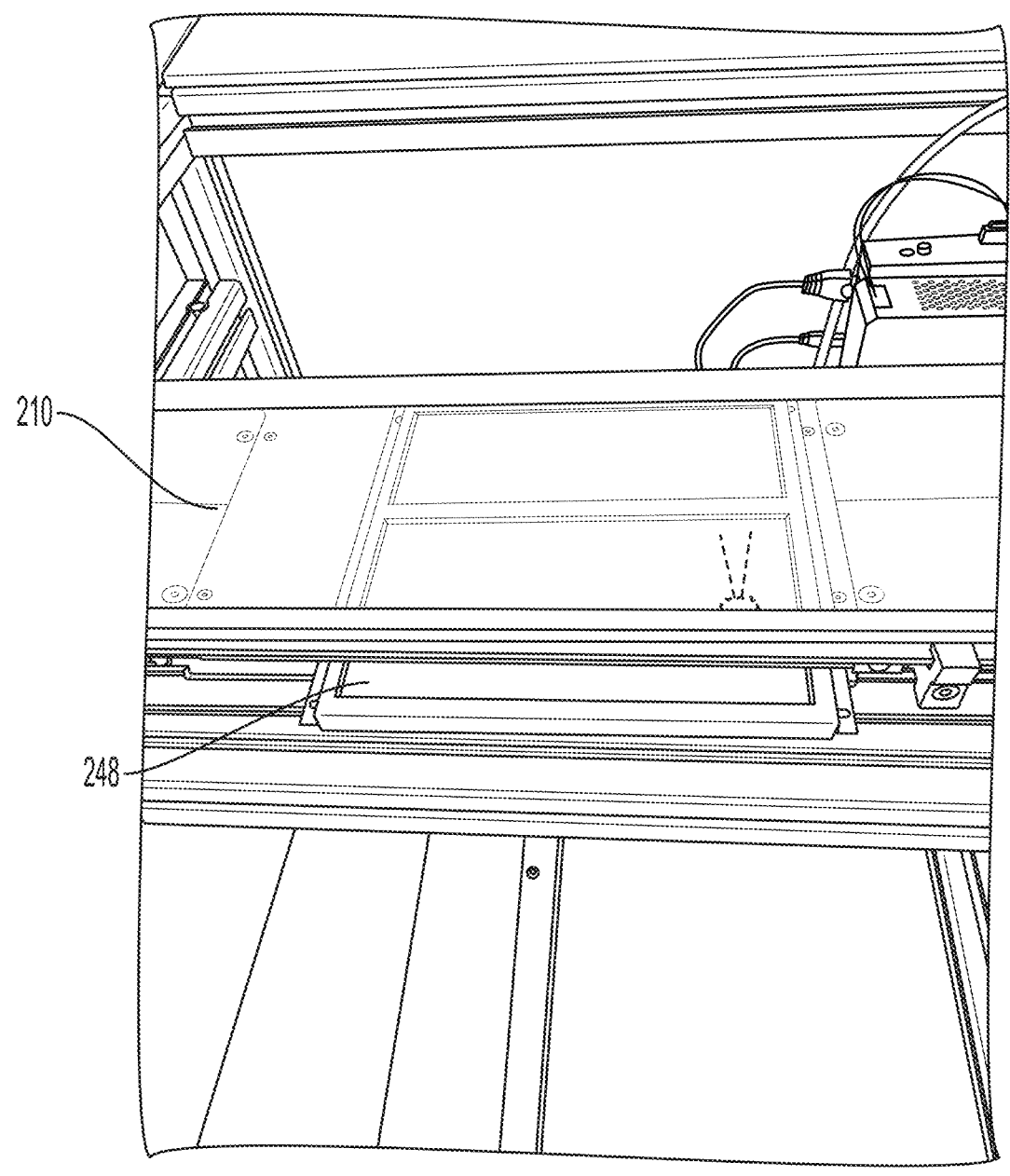
FIG. 9 is a view of an under conveyor belt light in a screen damage detecting system according to disclosed embodiments.
Figure 10:
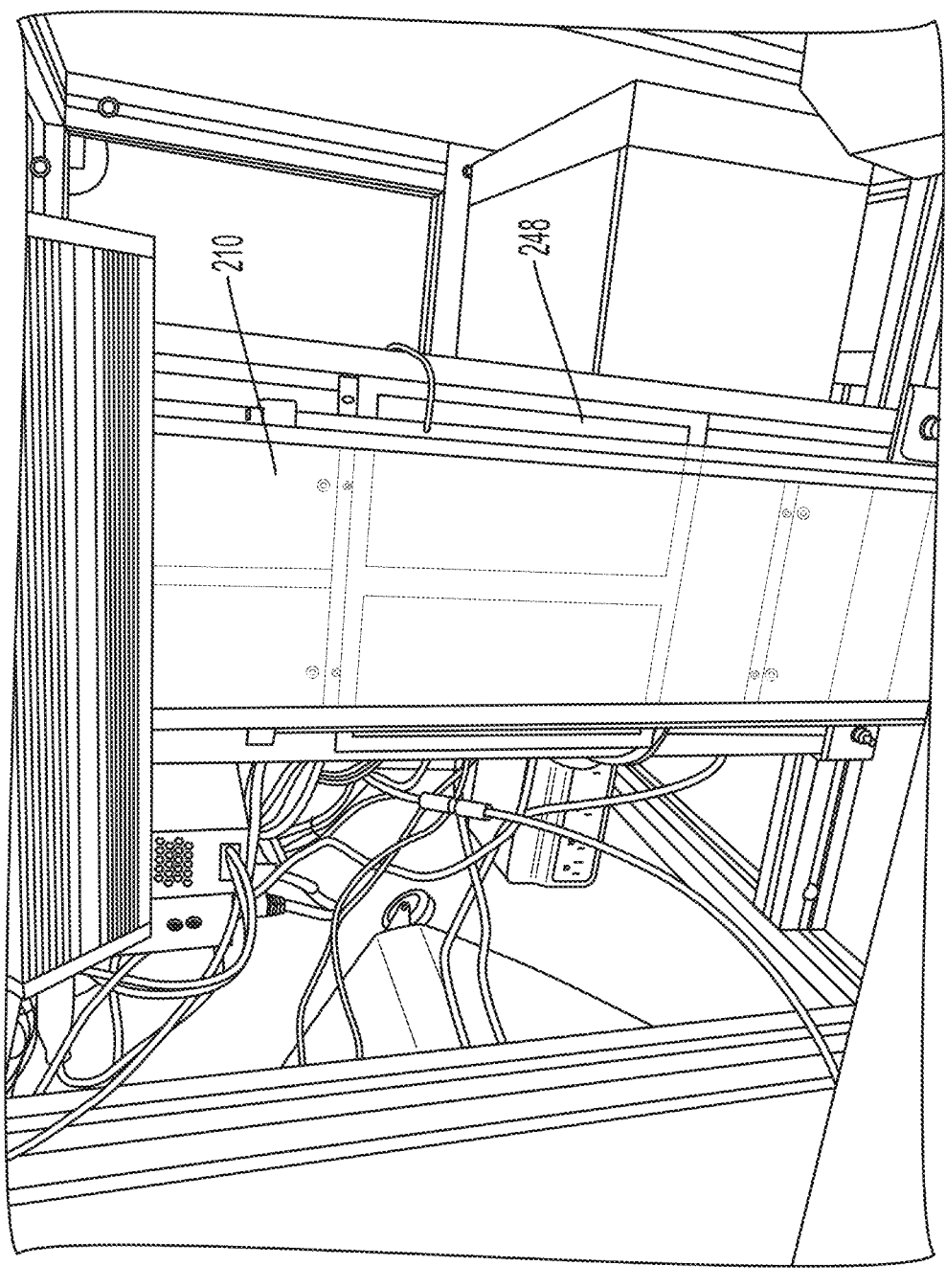
FIG. 10 is a view of an under conveyor belt light in a screen damage detecting system according to disclosed embodiments.
Figure 11:
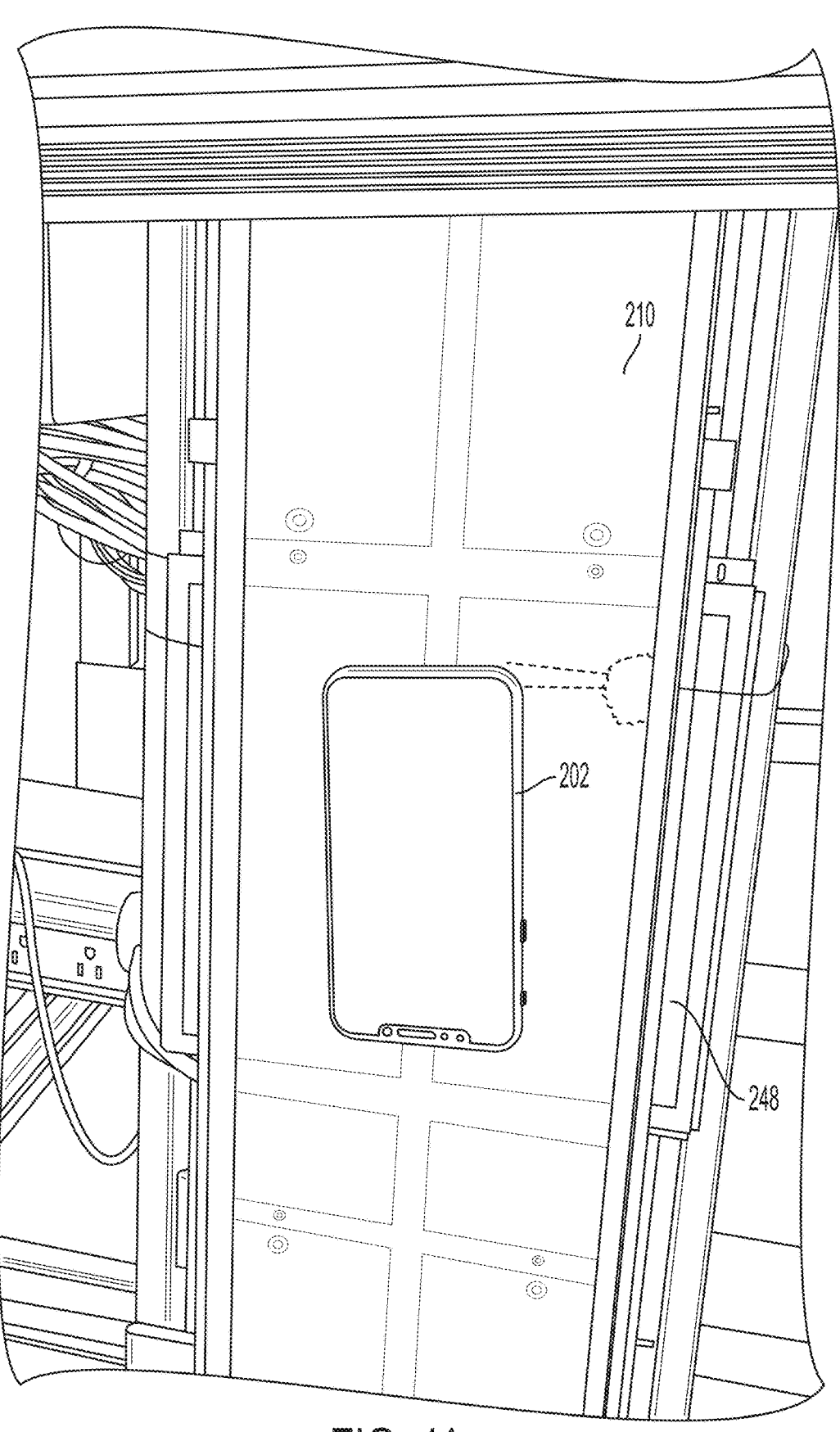
FIG. 11 is a view of a user device on a conveyor belt and located above an under conveyor belt light in a screen damage detecting system according to disclosed embodiments.

FIG. 4 is a schematic diagram of the screen damage detecting system 224 according to disclosed embodiments, and FIGS. 5-12 are other views of the screen damage detecting system 224 according to disclosed embodiments. As seen in FIGS. 4-8, in some embodiments, the screen damage detecting system 224 can include a lighting element 242 for example, an ELF infrared (IR) light, and an imaging device 244, both of which can be located within a housing 250. In some embodiments, an orientation of the lighting element 242 can be positioned relative to the platform 210, for example, above the platform 210, at an angle A, and an orientation of the imaging device 244 can be positioned relative to the platform, for example, above the platform 210, at the angle A such that light emitted from the lighting element 242 and a field of view of the imaging device 244 can form a right angle 246 where the light emitted from the lighting element 242 and the field of view of the imaging device 244 meet at the user device 202 when the user device 202 is located at a predetermined location within the screen damage detecting system 224.

As seen in FIGS. 4, 7, and 9-11, in some embodiments, the screen damage detecting system 224 can also include a lighting element 248, for example, a spectrum IR light, that can be located outside of the housing 250. In particular, in some embodiments, the lighting element 248 can be located under the platform 210, and in these embodiments, a portion of the platform 210 can be at least partially transparent to enable light emitted from the lighting element 248 to pass through the platform 210 and illuminate the user device 202 from underneath the platform 210.

Figure 12:
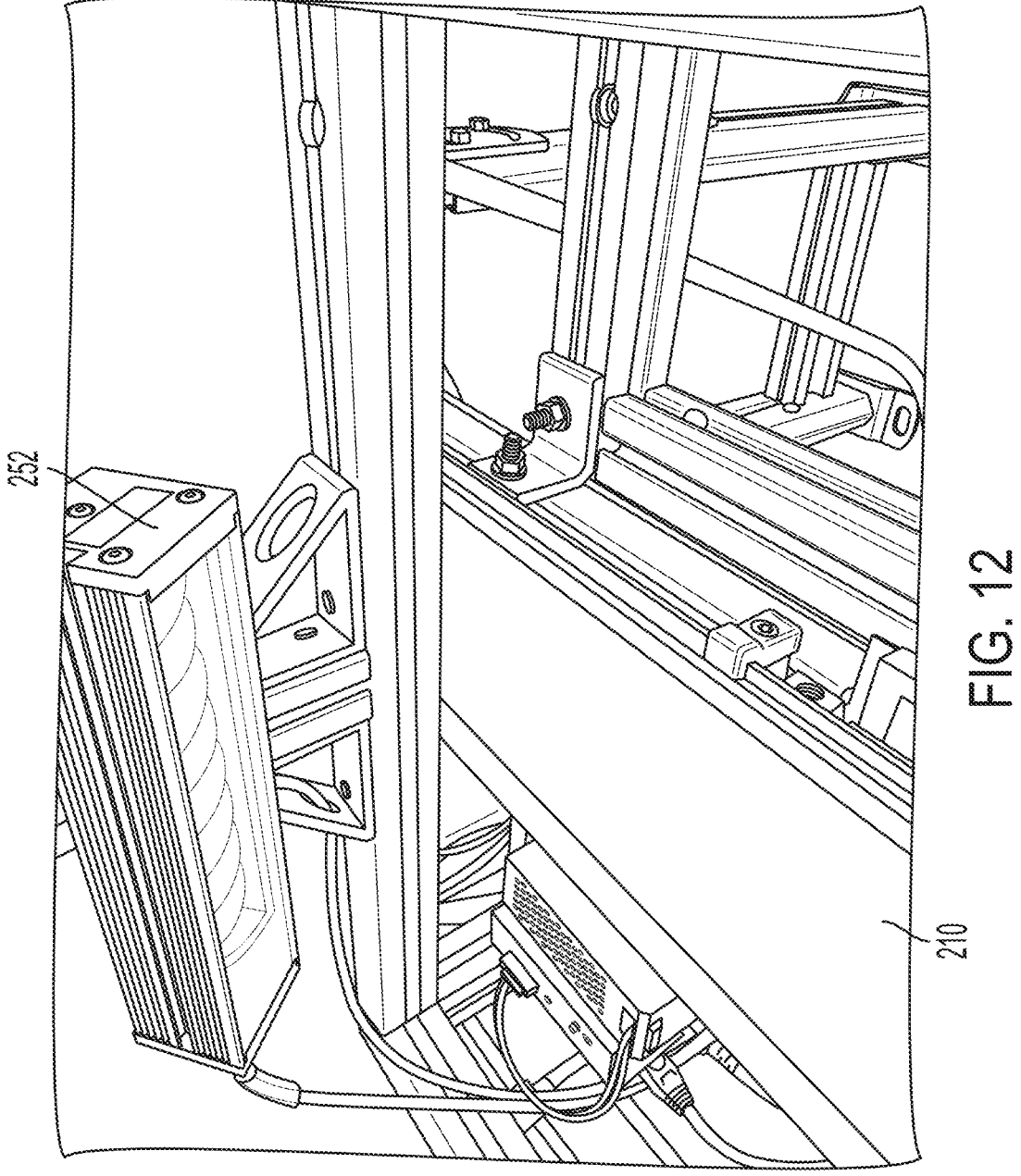
FIG. 12 is a view of an over conveyor belt light in a screen damage detecting system according to disclosed embodiments.

As seen in FIG. 12, in some embodiments, the screen damage detecting system 224 can also include a lighting element 252, for example, an ELF LED light, located within the housing 250 and opposite the first lighting element 242. In some embodiments, the third lighting element 252 can be vertically closer to the platform 210 than the lighting element 242.

Figure 13:
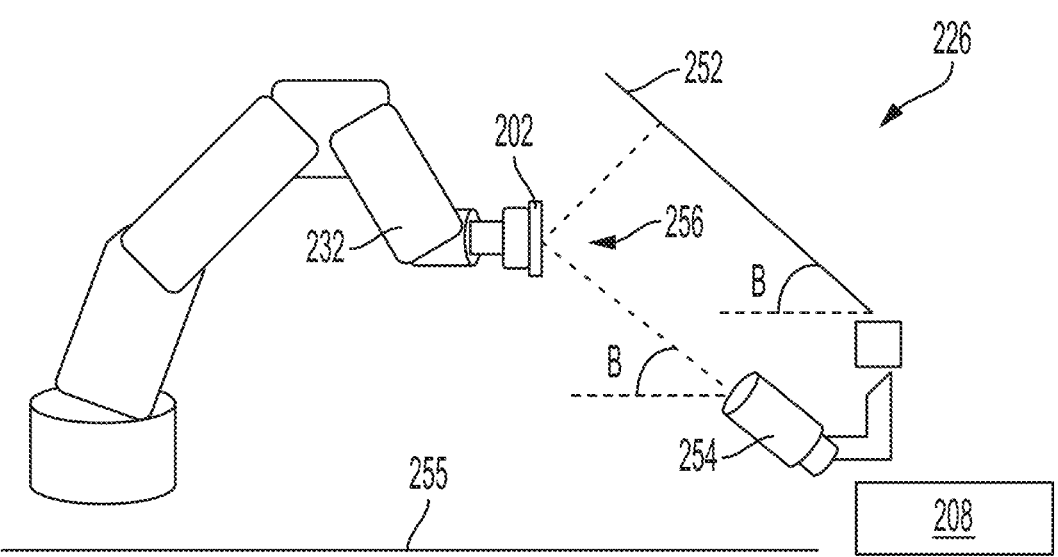
FIG. 13 is a schematic diagram of a back defect detecting system according to disclosed embodiments.

FIG. 13 is a schematic diagram of the back defect detecting system 226 according to disclosed embodiments. As seen in FIG. 13, the back defect detecting system 226 can include the positioning device 232 for positioning and orienting the user device 202 within the back defect detecting system 226, a lighting element 252, and an imaging device 254, for example, a line scanning camera. For example, the lighting element 252 can be positioned relative to a ground 255 or some other surface, such as one parallel to the ground 225, at an angle B, and the imaging device 254 can be positioned relative to the ground 255 or the other surface at the angle B such that light emitted from the lighting element 252 and a field of view of the imaging device 254 can form a right angle 256 where the light emitted from the lighting element 252 and the field of view of the imaging device 254 meet at the user device 202 when the user device 202 is located at a predetermined location and in a predetermined orientation within the back defect detecting system 226. In some embodiments, the predetermined orientation can include the back of the user device 202 facing the imaging device 254.

Figure 14:
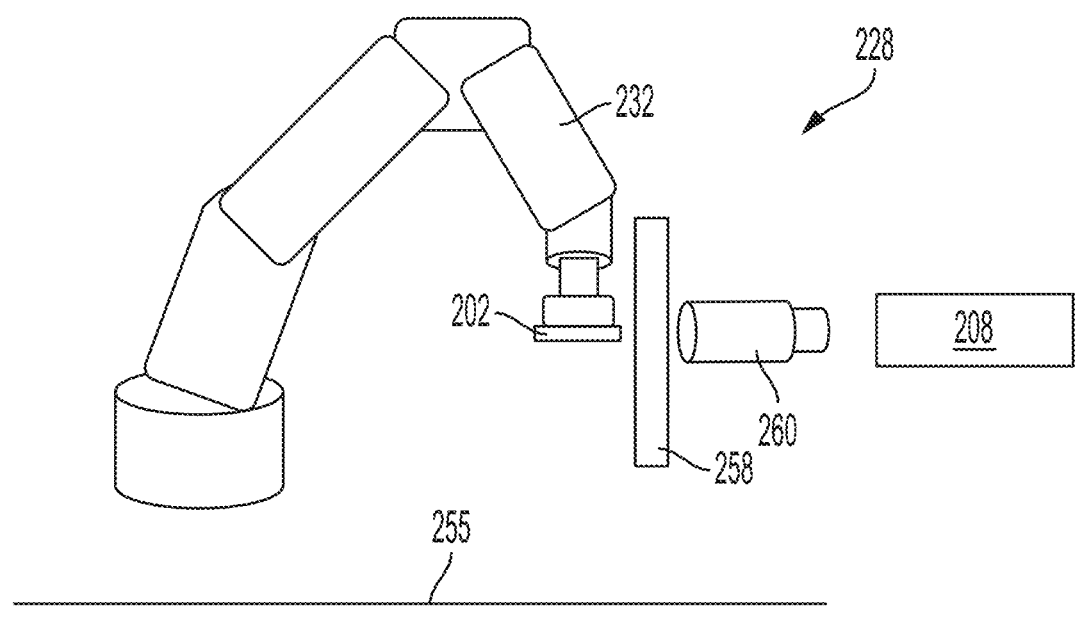
FIG. 14 is a schematic diagram of a side defect detecting system according to disclosed embodiments.

FIG. 14 is a schematic diagram of the side defect detecting system 228 according to disclosed embodiments. As seen in FIG. 14, the side defect detecting system 228 can include a lighting element 258, for example, an inline controller see-through bar light, and an imaging device 260, for example, a line scanning camera, that can be placed on one side of the lighting element 258 opposite a side of the lighting element 258 proximate to the user device 202. In some embodiments, the imaging device 260 can include a telecentric lens, and in these embodiments, the imaging device can be moved closer to and away from the lighting element 258 for capturing images of the user device 202.

Figure 15:
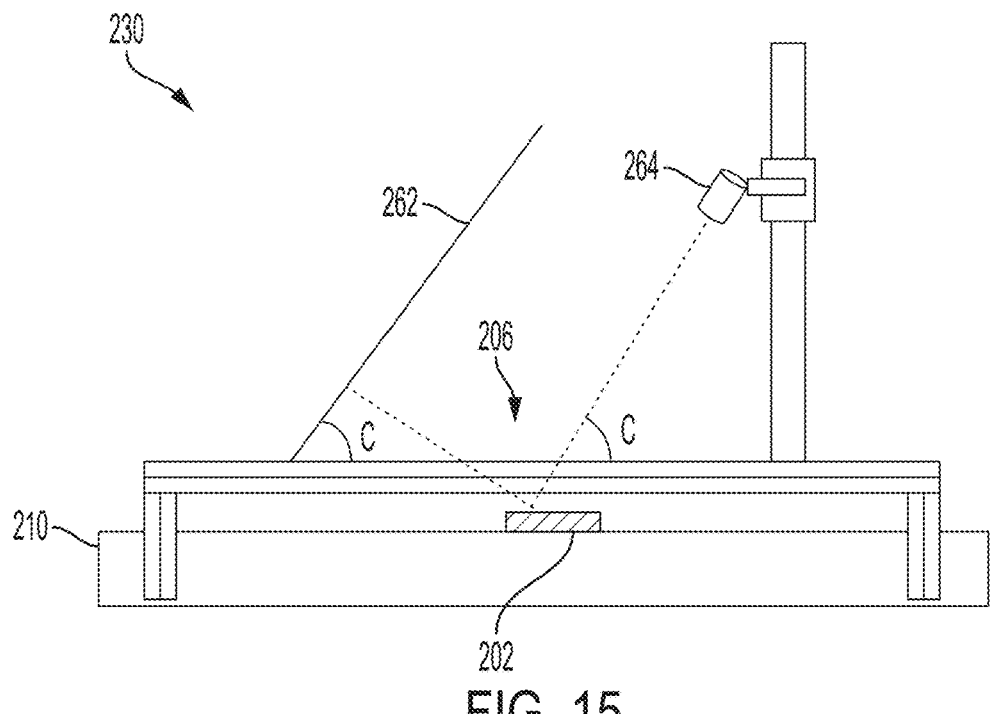
FIG. 15 is a schematic diagram of a screen defect detecting system according to disclosed embodiments.
Figure 16:
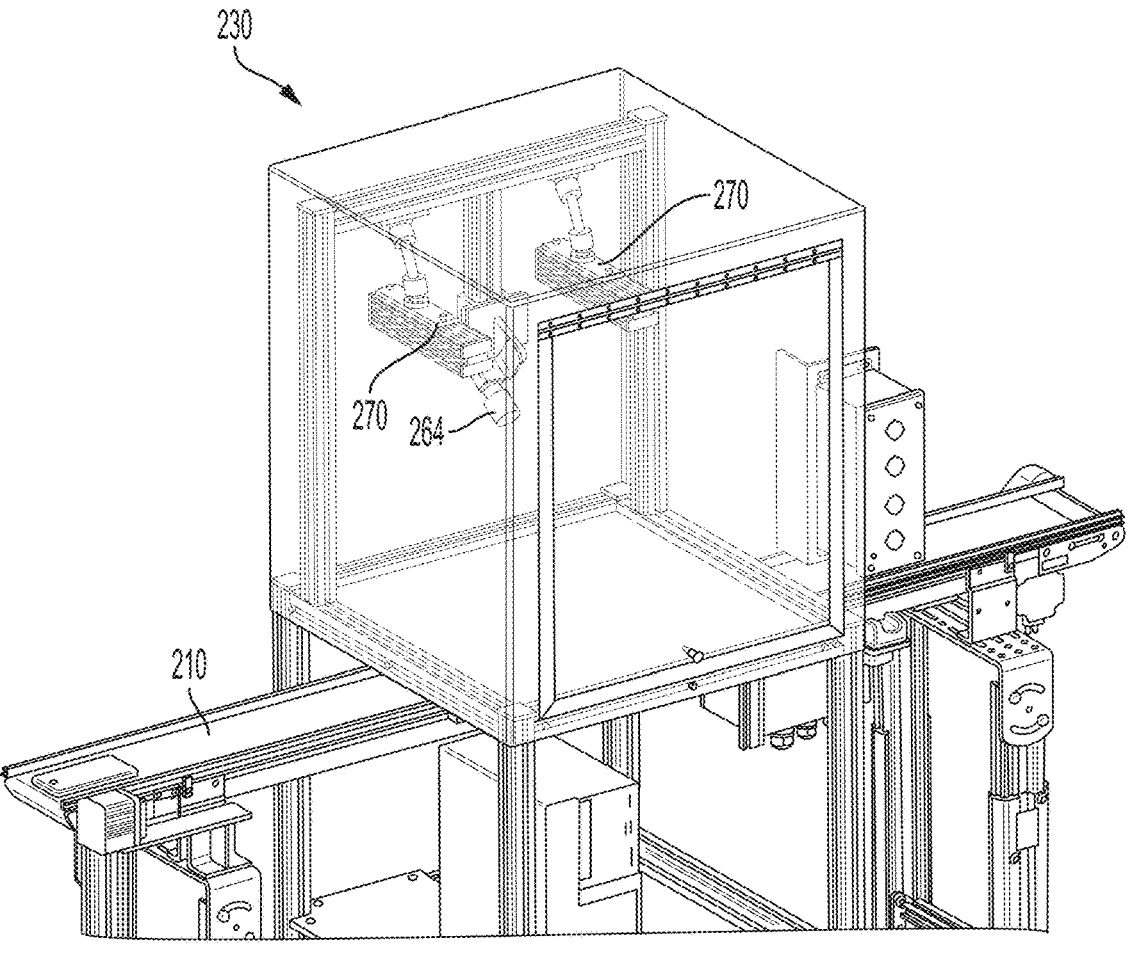
FIG. 16 is a perspective and partially transparent view of a screen defect detecting system according to disclosed embodiments.

FIG. 15 is a schematic diagram of the screen defect detecting system 230 according to disclosed embodiments, and FIG. 16 is another view of the screen defect detecting system 230 according to disclosed embodiments. As seen in FIG. 15, in some embodiments, the screen defect detecting station 230 can include a lighting element 262, for example, an ELF LED light, that can be positioned relative to the platform 210 at an angle C and an imaging device 264, for example, a line scanning camera, that can be positioned relative to platform 210 at the angle C such that light emitted from the lighting element 262 and a field of view of the imaging device 264 can form a right angle 266 where the light emitted from the lighting element and the field of view of the imaging device 264 meet at the user device 202 when the user device 202 is located at a predetermined location within the screen defect detecting system 230. Additionally or alternatively, as seen in FIG. 16, in some embodiments, the screen defect detecting system 230 can include lighting elements 270 that can be oriented parallel to the platform 210 so that light emitted from the lighting elements 270 is perpendicular to the platform 210.

While the control circuitry 208 is shown in the figures as separate and apart from other elements of the system 200, it is to be understood that the control circuitry 208 can be integrated into and/or otherwise communicate with the other elements of the system 200 so as to control and/or instruct the other elements of the system 200 to execute methods described herein.

In this regard, the inflow system 204, the grading and sorting system 206, the platform 210, and various sub-components thereof can be controlled by a single central processor or multiple processor coupled together. For example, each of the inflow system 204, the grading and sorting system 206, the platform 210, and the various sub-components thereof can include a respective transceiver device and a respective memory device, each of which can be in communication with respective control circuitry, for example, the control circuitry 208, one or more respective programmable processors, and respective executable control software as would be understood by one of ordinary skill in the art. In some embodiments, the respective executable control software of each of the inflow system 204, the grading and sorting system 206, the platform 210, and the various sub-components thereof can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the inflow system 204, the grading and sorting system 206, the platform 210, and the various sub-components thereof can execute and control at least some of the methods described herein.

FIG. 17 is a flow diagram of a method 300 according to disclosed embodiments. As seen in FIG. 17, the method 300 can include the control circuitry 208 starting the inflow system 204, as in 302, detecting the user device 202 with the sensor 212, as in 304, and controlling a speed of the first section 216 and the second section 218 to equally space the user device 202 relative to other user devices in the system 200, as in 306.

Then, the method 300 can include the control circuitry 208 scanning the user device 202 with the imaging device 214 to identify the user device 202 to the control circuitry 208, as in 308. In some embodiments, identifying the user device 202 to the control circuitry 208 can include the control circuitry 208 receiving any information identifying a make and a model of the user device 202 and the control circuitry 208 generating a database entry for the user device 202 into which a cosmetic grade for the user device 202 can be saved.

After scanning the user device 202, the method 300 can include the control circuitry 208 activating the third section 220 to transport the user device 202 to the screen damage detecting system 224, as in 310. Then, the method 300 can include the control circuitry 208 (1) activating the lighting element 242 and the lighting element 248 simultaneously with the lighting element 242 and (2) instructing the imaging device 244 to capture a first image of the screen of the user device 202 while the user device 202 is at the predetermined location within the screen damage detecting system 224 and is being illuminated by the lighting element 242 and the lighting element 248, as in 312.

After capturing the first image of the screen of the user device 202, the method 300 can include the control circuitry 208 parsing the first image of the screen of the user device 202 to determine whether the screen of the user device 202 is damaged, as in 314. For example, in some embodiments, the control circuitry 208 can determine that the screen of the user device 202 is damaged when the control circuitry 202 identifies at least a predetermined number of cracks on the screen of the user device 202 depicted in the first image of the user device 202. When the control circuitry 208 determines that the screen of the user device 202 is damaged, the method 300 can include the control circuitry 208 assigning the user device 202 a lowest cosmetic grade and directing the platform 210 to maneuver the user device 202 to the first end location 234, as in 316. For example, in some embodiments, the control circuitry 208 can direct a first pushing device to push the user device 202 onto a conveyor belt associated with the first end location 234 after the user device 202 leaves the screen damage detecting system 224.

However, when the control circuitry 208 fails to determine that the screen of the user device is damaged, the method 300 can include the control circuitry 208 directing the positioning device 232 to position the user device 202 within the back defect detecting system 226 with the predetermined orientation, as in 318. Then, the method 300 can include the control circuitry 208 activating the lighting element 252 and instructing the imaging device 254 to capture an image of the back of the user device 202 while the user device 202 is at the predetermined location within the back defect detecting system 226 and is being illuminated by the lighting element 252, as in 320. In some embodiments, the method 300 can include the control circuitry 208 directing the positioning device 232 to maneuver a center of the user device 202 toward or away from an apex of the right angle 256 to ensure optimal image clarity during acquisition of the image of the back of the user device 202.

Before or after the user device 202 is in the back defect detecting system 226, the method 300 can include the control circuitry 208 (1) directing the positioning device 232 to position the user device 202 within the side defect detecting system 228, as in 321, (2) activating the lighting element 258, and (3) directing the positioning device 252 to rotate all sides of the user device 202 through the field of view of the imaging device 260 and light emitted by the lighting element 258 within the side defect detecting system 228, as in 322. During such rotation, the method 300 can include the control circuitry 208 instructing the imaging device 260 to capture the images of the sides of the user device 202 while the user device 202 is being illuminated by the lighting element 258, as in 324.

Immediately or some other time after capturing the image of the back of the user device 202 and the images of the sides of the user device 202, the method 300 can include the control circuitry 208 parsing the image of the back of the user device 202 and the images of the sides of the user device 202 to determine whether the back of the user device 202 and/or any sides of the user device 202 are defective, as in 326. For example, in some embodiments, the control circuitry 208 can determine that the back of the user device 202 or the sides of the user device 202 are defective when the control circuitry 202 identifies at least a predetermined amount cracks or scratches on the back of the user device 202 depicted in the image of the back of the user device or the sides of the user device 202 depicted in the images of the sides of the user device. When the control circuitry 208 determines that the back of the user device 202 or any sides of the user device 202 are defective, the method 300 can include the control circuitry assigning the user device 202 a lowest cosmetic grade and directing the platform to maneuver the user device 202 to the second end location 236 and/or the fifth end location, as in 328. For example, in some embodiments, the control circuitry 208 can direct a second pushing device to push the user device 202 onto a conveyor belt associated with the second end location 236 and/or the fifth end location after the user device 202 leaves the back defect detecting system 226 and the side defect detecting system 228.

However, when the control circuitry 208 fails to determine that the back of the user device 202 or any sides of the user device 202 are defective, the method 300 can include the control circuitry 208 directing the platform 210 to transport the user device 202 to the screen defect detecting system 230, as in 330.

After transporting the user device 202 to the screen defect detecting system 230, the method 300 can include the control circuitry 208 activating the lighting element 262 and instructing the imaging device 264 to capture a second image of the screen of the user device 202 while the user device 202 is at the predetermined location within the screen defect detecting system 230 and is being illuminated by the lighting element 264, as in 332. Then, the method 300 can include the control circuitry 300 parsing the second image of the screen of the user device 202 to determine whether the screen of the user device 202 is defective, as in 334. For example, in some embodiments, the control circuitry 208 can determine that the screen of the user device 202 is defective when the control circuitry 202 identifies at least a predetermined number of scratches on the screen of the user device 202 depicted in either the first of the user device 202 or the second image of the user device 202. When the control circuitry 208 determines that the screen of the user device 202 is defective, the method 300 can include the control circuitry 208 assigning the user device 202 a medium cosmetic grade and directing the platform 210 to maneuver the user device 202 to the third end location 238, as in 336. For example, in some embodiments, the control circuitry 208 can direct a third pushing device to push the user device 202 onto a conveyor belt associated with the third end location 238 after the user device 202 leaves the screen defect detecting system 230. However, when the control circuitry 208 fails to determine that the screen of the user device 202 is defective, the method 300 can include the control circuitry assigning the user device 202 a highest cosmetic grade and directing the platform 210 to maneuver the user device 202 to the fourth end location 240, as in 338.

In some embodiments, the grading and sorting system 206 need not include the screen defect detecting station 230, and in these embodiments, when the control circuitry 202 fails to determine that the screen of the user device 202 is damaged, the method 300 can include the control circuitry 208 parsing the first image of the screen of the user device 202 again to determine whether the screen is defective.

In some embodiments, prior to instructing the imaging device 244, the imaging device 254, the imaging device 260, and/or the imaging device 264 to capture the above-identified images, the method 300 can also include the control circuitry 208 instructing some or all of those imaging device to adjust various parameters thereof for obtaining a highest quality image possible. For example, in some embodiments, the various parameters can include line acquisition rate, exposure, brightness, and contrast, and the control circuitry 208 can identify optimal values for those parameters based on a color of the user device 202 and a speed that the user device 202 is being moved relative to a respective one of the imaging devices 244, 254, 260, and 264. In these embodiments, the system 200 can include an encoder that can identify the speed of the user device 202 with positional data transmitted to the control circuitry 208 and a device color sensor that can identify the color of the user device 202 with RGB value data transmitted to the control circuitry 208.

While the multi-stage automated assembly line system 100 and the system 200 are shown in separate figures and described as separate embodiments, it is to be understood that any and all stations, systems, devices, or other components of the multi-stage automated assembly line system 100 can be used in connection with the system 200 and that any and all stations, systems, devices, or other components of the system 200 can be used in connection with the multi-stage automated assembly line system 100. As such, it is to be understood that the multi-stage automated assembly line system 100 can execute some or all of the method 300. For example, as a specific, but non-limiting example, the first station 102 and the second station 106 of the multi-stage automated assembly line system 100 can identify the user device 202, as in 308. As another specific, but non-limiting example, the third station 108 of the multi-stage automated assembly line system 100 can determine whether the screen of the user device 202 is damaged or defective, as in 314 and 334, and the fourth station 110 of the multi-stage automated assembly line system 100 can determine whether the back of the user device 202 or the sides of the user device 202 are defective, as in 326.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
    one or more grading stations associated with one or more imaging devices;
    a conveyor associated with the one or more grading stations; and
    control circuitry configured to:
        cause the conveyor to move a user device to one or more locations associated with the one or more grading stations;
        cause the one or more imaging devices to capture one or more images of the user device; and
        determine, based on the one or more images and using one or more artificial intelligence algorithms, whether a screen of the user device, a back of the user device, a side of the user device, or a camera of the user device is damaged, wherein the one or more artificial intelligence algorithms are trained to generate device grading using captured images of a plurality of known devices associated with different degrees of defects; and
    one or more end locations configured for receiving the user device based on a grade assigned to the user device based on a condition of the screen of the user device, the back of the user device, the side of the user device, or the camera of the user device, wherein the one or more end locations comprise a first end location for receiving user devices having damaged screens and a second end location for receiving user devices having undamaged or non-defective user devices.

2. The system of claim 1, wherein the one or more grading stations comprises at least one of: (i) a screen damage detecting system, a back defect detecting system, a side defect detecting system, or a screen defect detecting system.

3. The system of claim 1, further comprising one or more lighting elements associated with the one or more grading stations.

4. The system of claim 3, wherein the control circuitry is further configured to:

activate at least one lighting element of the one or more lighting elements simultaneously with at least one imaging device of the one or more imaging devices, and instruct the at least one imaging device to capture at least one image while the user device is at a predetermined location and is being illuminated by the at least one lighting element.

5. The system of claim 3, wherein:

a first lighting element of the one or more lighting elements is positioned relative to the conveyor at a first angle measured between the conveyor and a light-emitting surface of the first lighting element, and a first imaging device of the one or more imaging devices is positioned such that an axis of a field of view of the first imaging device is positioned at a second angle relative to the conveyor, the second angle being the same as the first angle.

6. The system of claim 5, wherein light emitted from the first lighting element and the axis of the field of view of the first imaging device form a right angle where the light emitted from the first lighting element and the axis of the field of view of the first imaging device meet at the user device when the user device is located at a predetermined location.

7. The system of claim 3, wherein at least one lighting element of the one or more lighting elements is positioned below the conveyor, wherein at least a portion of the conveyor is transparent to enable light emitted from the at least one lighting element to pass through the conveyor and illuminate the user device.

8. The system of claim 3, wherein at least one grading station of the one or more grading stations further comprises a positioning device, wherein the control circuitry is configured:

to activate the positioning device to position and/or rotate the user device through a field of view of at least one imaging device of the one or more imaging devices associated with the at least one grading station, and instruct the at least one imaging device to capture at least one image of the user device.

9. The system of claim 3, wherein the one or more lighting elements comprises one or more ultraviolet light emitting elements or infra-red lights.

10. The system of claim 3, wherein causing the one or more imaging devices to capture the one or more images of the user device comprises:

identifying one or more optimal values for one or more optical parameters associated with at least one imaging device based on data associated with an identity of the user device; and instructing the at least one imaging device to adjust the one or more optical parameters based on the one or more optimal values.

11. The system of claim 3, wherein causing the one or more imaging devices to capture the one or more images of the user device comprises:

identifying one or more optimal values for one or more optical parameters associated with at least one imaging device based on a color of the user device; and instructing the at least one imaging device to adjust the one or more optical parameters based on the one or more optimal values.

12. The system of claim 11 further comprising a device color sensor configured to identify the color of the user device and transmit data describing the color of the user device to the control circuitry.

13. The system of claim 3, wherein the control circuitry is configured to optimize one or more of polarization patterns or exposure rates associated with the one or more lighting elements.

14. The system of claim 3, wherein at least one lighting element comprises a planar lighting element.

15. The system of claim 3, wherein the one or more lighting elements have variable intensities.

16. The system of claim 1, further comprising comprises an inflow system associated with the one or more grading stations.

17. The system of claim 1, wherein the one or more grading stations define a multi-stage automated assembly line.

18. The system of claim 1, wherein at least one imaging device comprises a line scanning camera.

\* \* \* \* \*